(12) United States Patent
Rey

(10) Patent No.: US 11,578,574 B2
(45) Date of Patent: Feb. 14, 2023

(54) HIGH POWER DENSE DOWN-HOLE HEATING DEVICE FOR ENHANCED OIL, NATURAL GAS, HYDROCARBON, AND RELATED COMMODITY RECOVERY

(71) Applicant: Christopher M Rey, Knoxville, TN (US)

(72) Inventor: Christopher M Rey, Knoxville, TN (US)

(*) Notice: Subject to any disclaimer, the term of this patent is extended or adjusted under 35 U.S.C. 154(b) by 1247 days.

(21) Appl. No.: 14/816,243

(22) Filed: Aug. 3, 2015

(65) Prior Publication Data

US 2016/0053596 A1 Feb. 25, 2016

Related U.S. Application Data

(60) Provisional application No. 62/040,061, filed on Aug. 21, 2014.

(51) Int. Cl.
*E21B 43/24* (2006.01)
*H05B 3/40* (2006.01)
*E21B 43/26* (2006.01)

(52) U.S. Cl.
CPC ...... *E21B 43/2401* (2013.01); *E21B 43/2406* (2013.01); *E21B 43/26* (2013.01); *H05B 3/40* (2013.01); *H05B 2203/032* (2013.01); *H05B 2214/03* (2013.01)

(58) Field of Classification Search
CPC .. E21B 43/24; E21B 43/2401; E21B 43/2406; E21B 43/26; H05B 3/40; H05B 3/36; H05B 2203/32; H05B 2214/03
See application file for complete search history.

(56) References Cited

U.S. PATENT DOCUMENTS

2008/0217016 A1   9/2008  Stegemeier et al.
2011/0297237 A1*  12/2011 Blum ................ E21B 29/08
                                                          137/1
2016/0168977 A1*  6/2016  Donderici ........... E21B 47/07
                                                          175/45

* cited by examiner

*Primary Examiner* — Yong-Suk (Philip) Ro
(74) *Attorney, Agent, or Firm* — TechnicalAttorney; Rick Barnes

(57) ABSTRACT

A superconducting down-hole heating device with a superconducting cable, a cryostat around the superconducting cable, and a heat source coupled to the superconducting cable. The device is configured to use within a well-casing, and to produce heat outside of the cryostat and not inside of the cryostat.

14 Claims, 17 Drawing Sheets

Single phase AC, co-axial Down Hole Heater with a stationary heat source

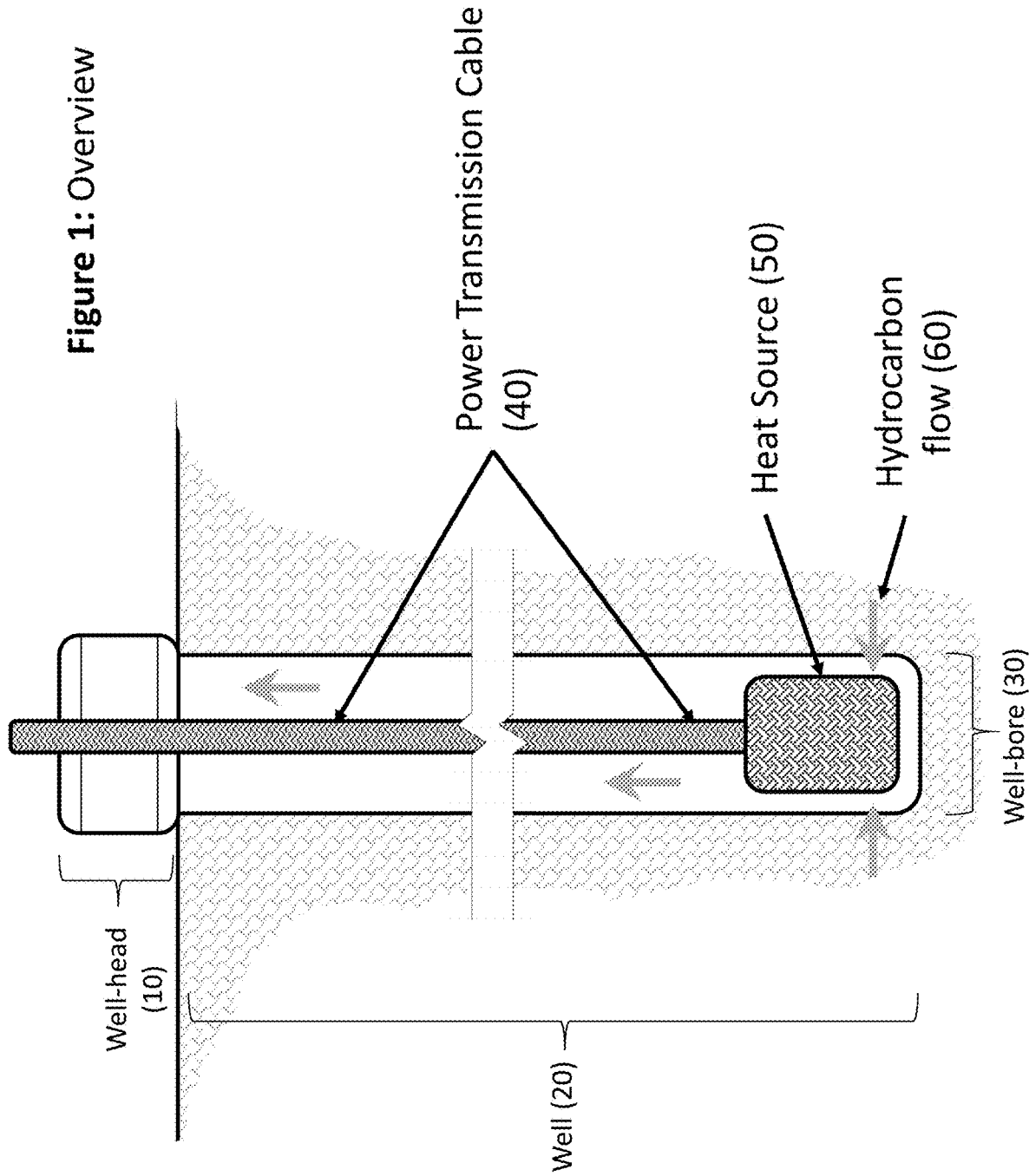

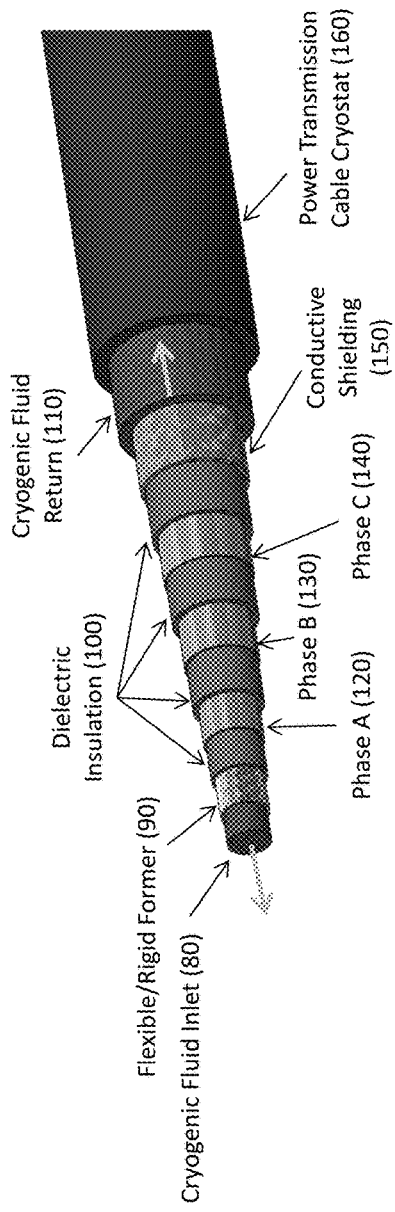
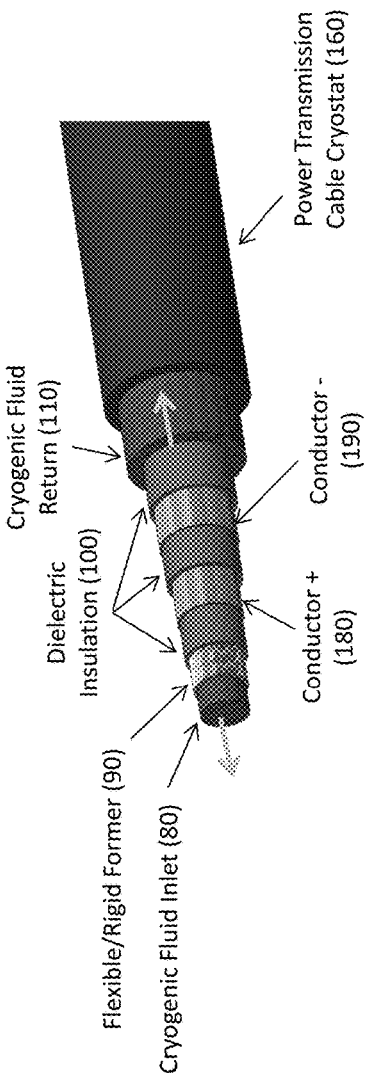

Twisted Conductor Pair (200)

Bi-Polar Cable (220)

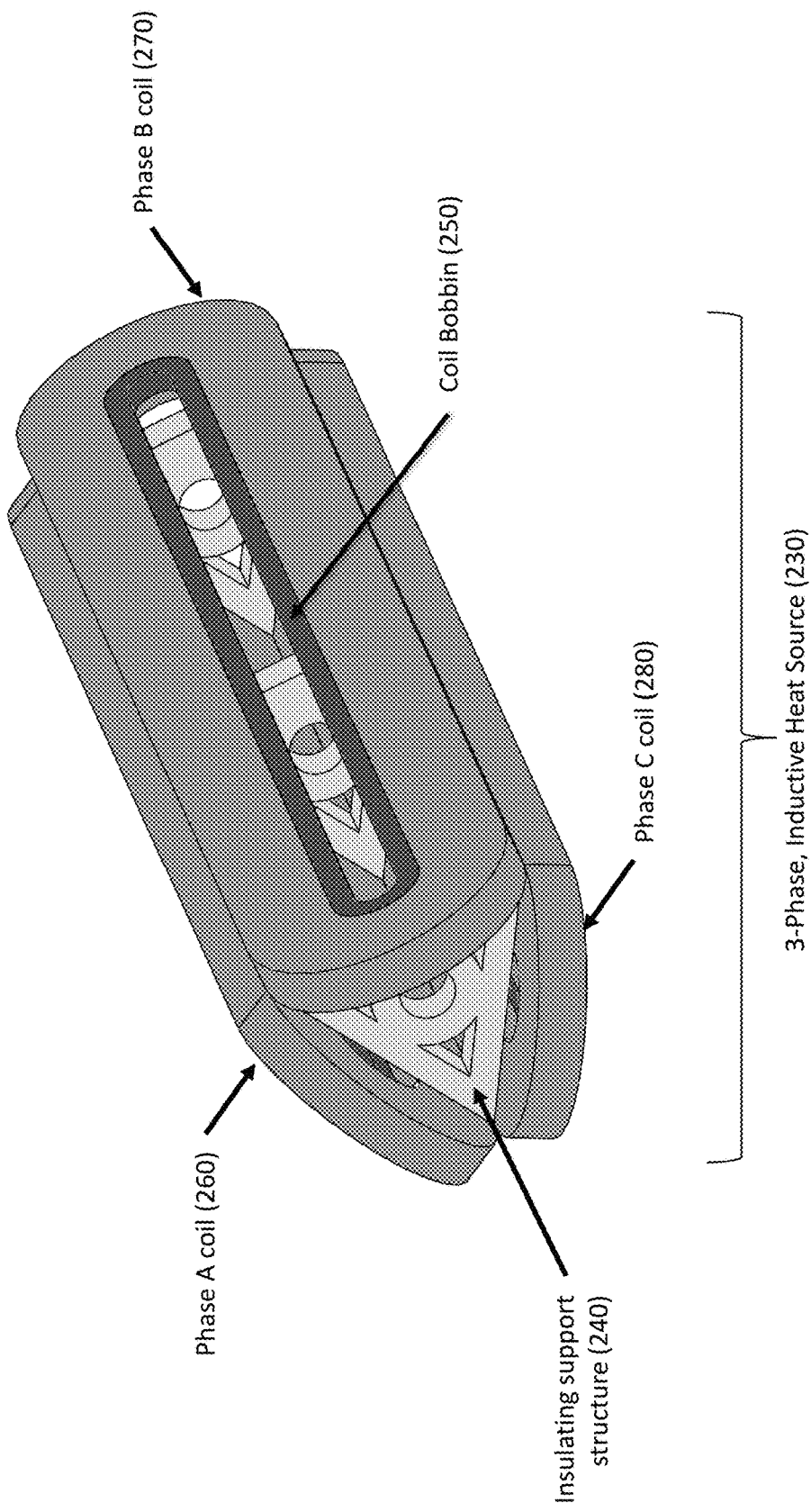
Figure 4 – 3 Phase AC, Inductive Heat Source

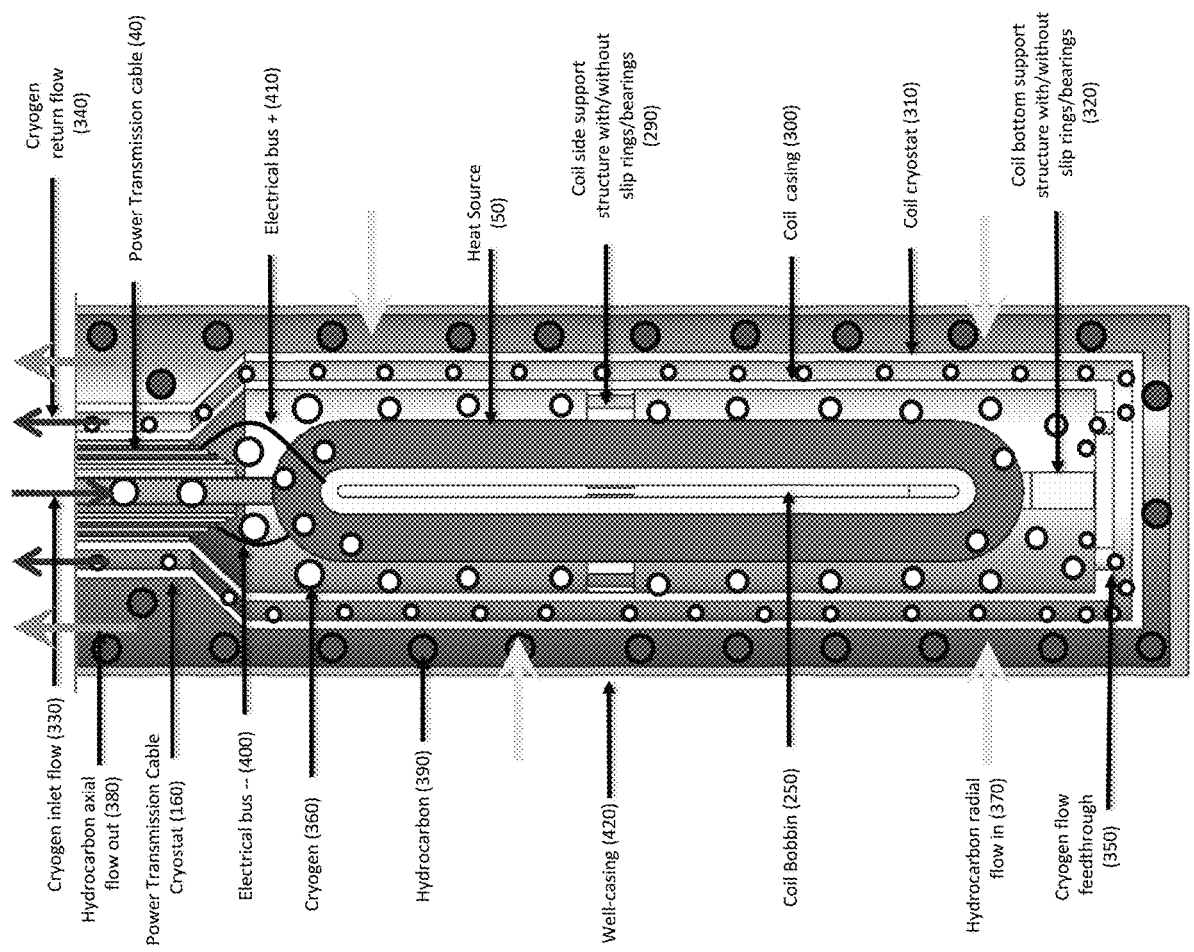
Figure 5: Single phase AC, co-axial Down Hole Heater with a stationary heat source

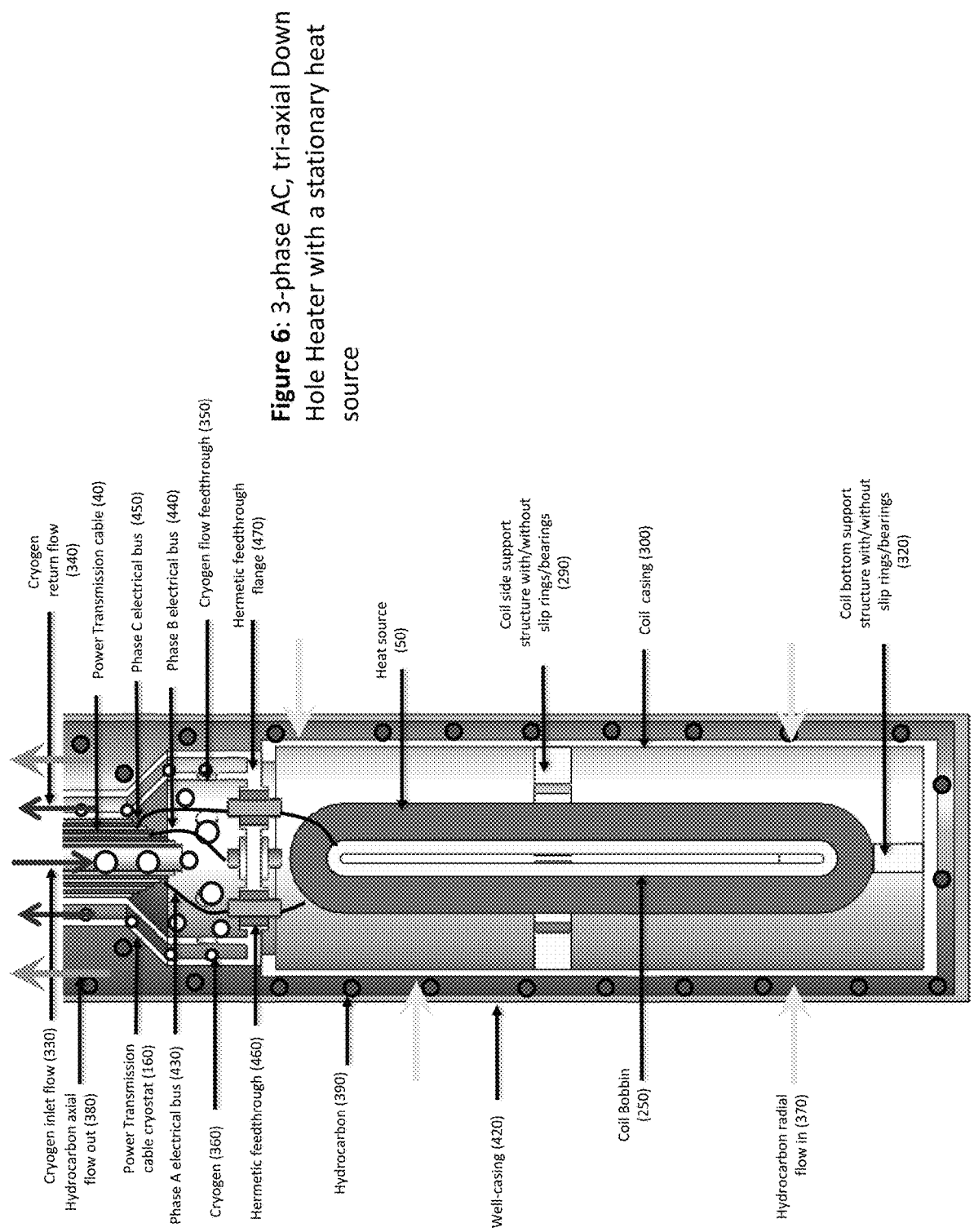
Figure 6: 3-phase AC, tri-axial Down Hole Heater with a stationary heat source

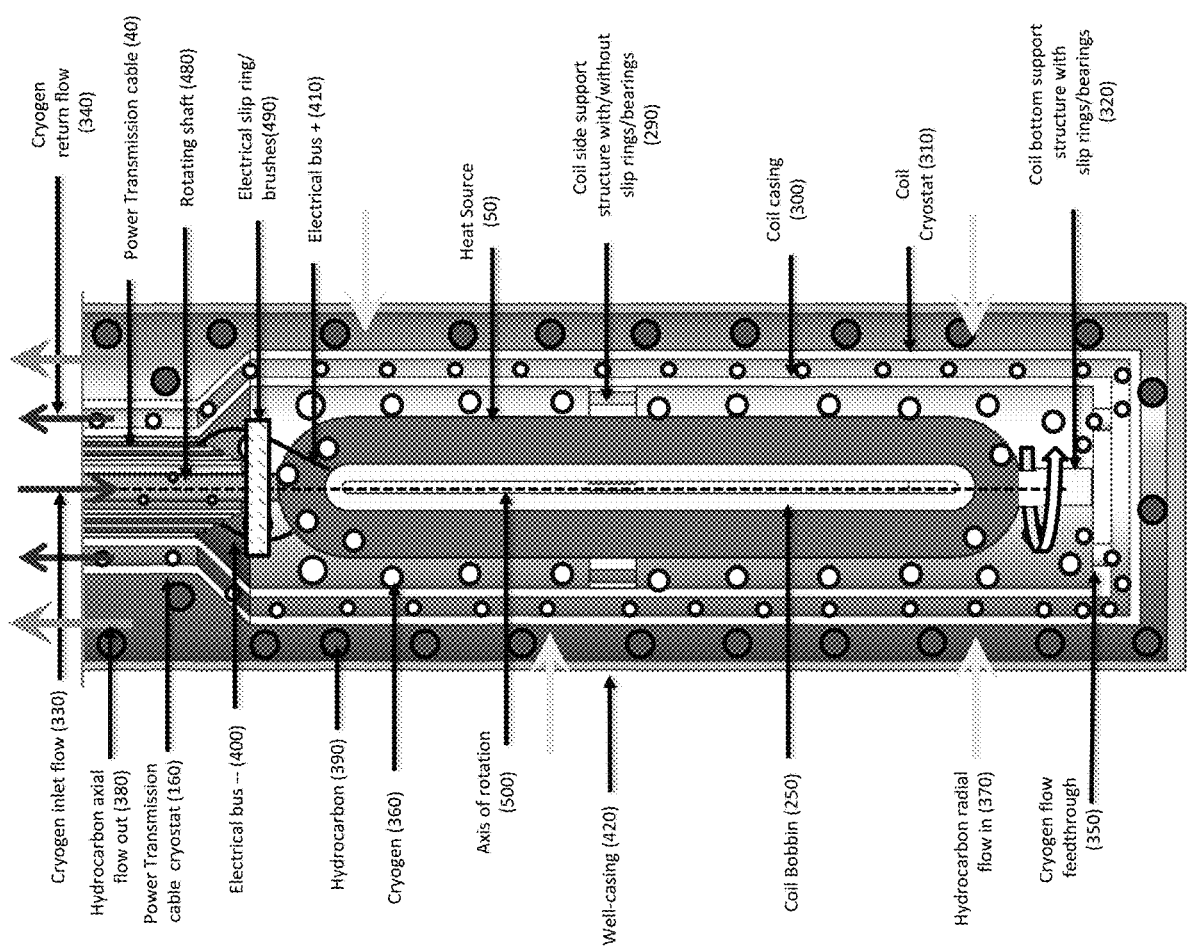
Figure 7: DC, co-axial Down Hole Heater with a rotating heat source

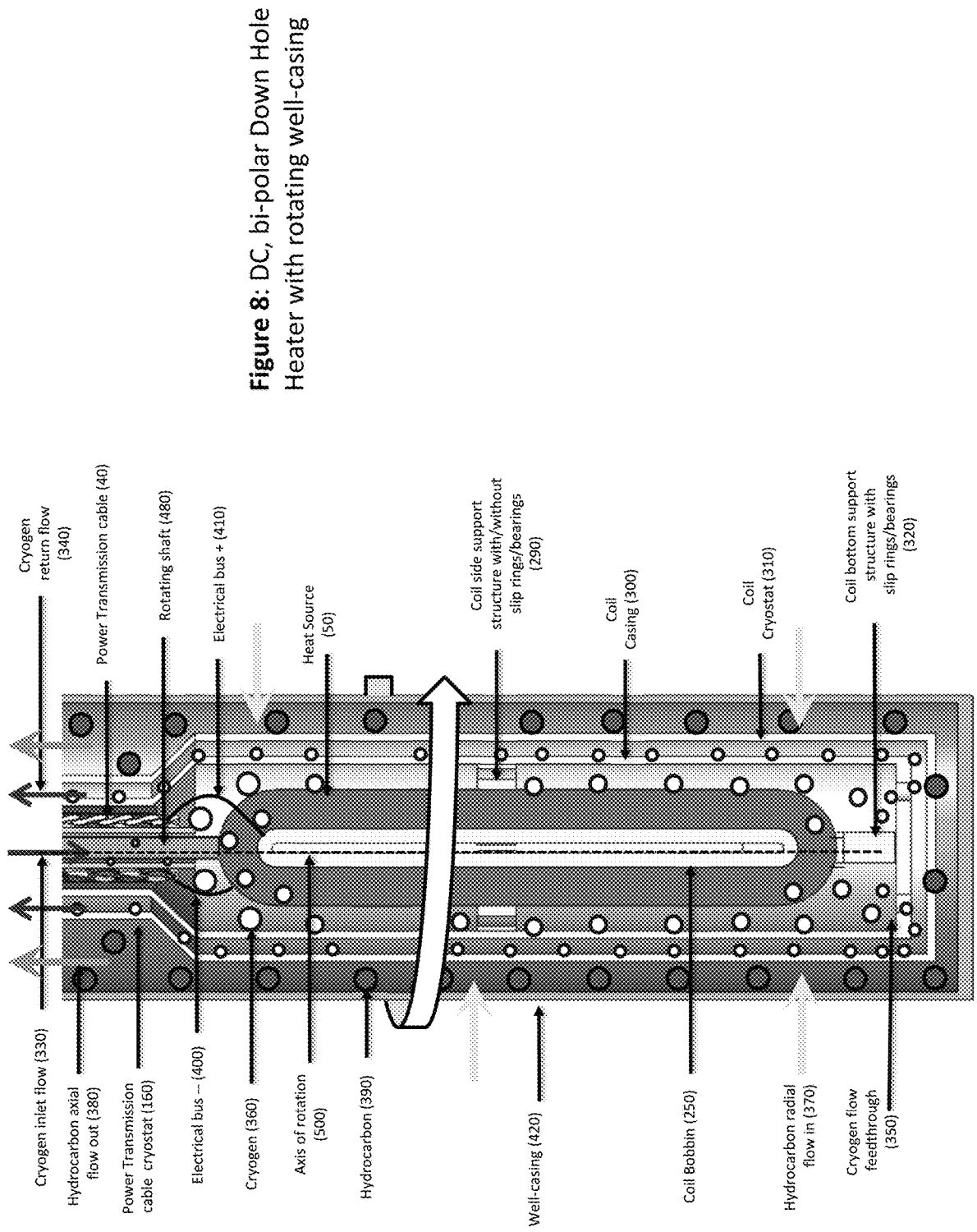
Figure 8: DC, bi-polar Down Hole Heater with rotating well-casing

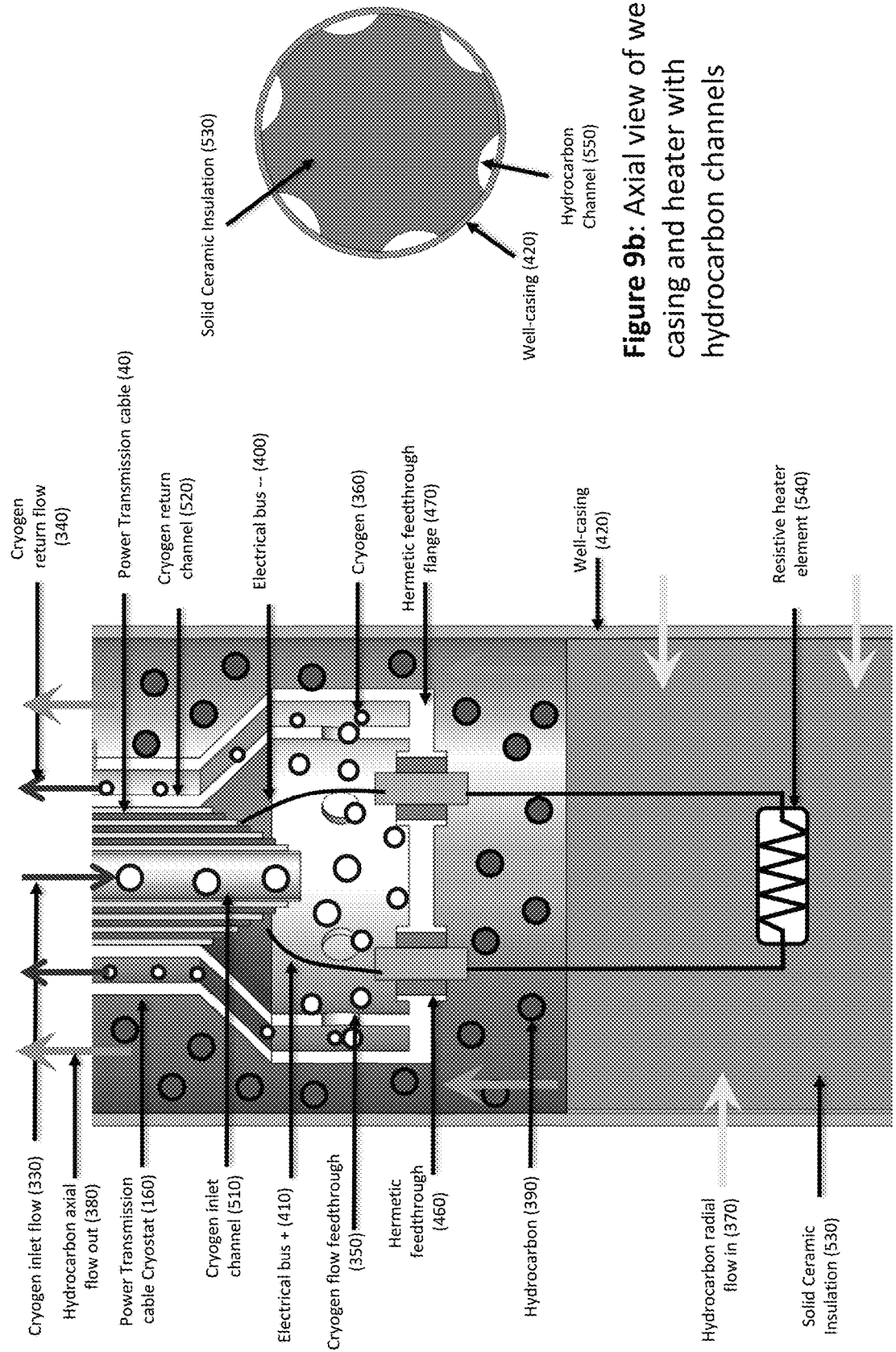
Figure 9b: Axial view of well-casing and heater with hydrocarbon channels
Figure 9a: Cross section of a bi-polar, DC or single phase AC Down Hole Heater

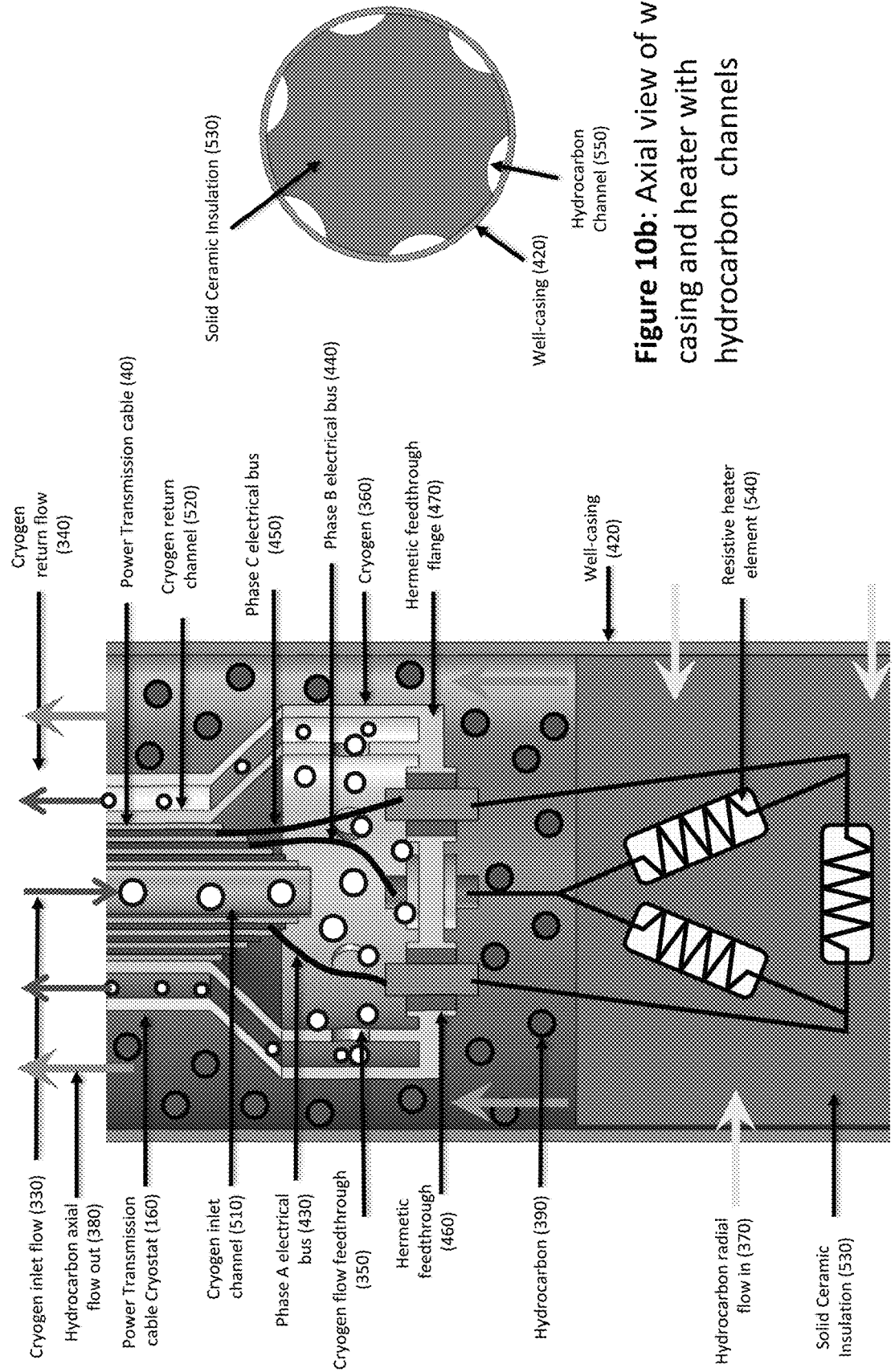
Figure 10b: Axial view of well-casing and heater with hydrocarbon channels
Figure 10a: Cross section of a tri-axial, 3-phase AC Down Hole Heater

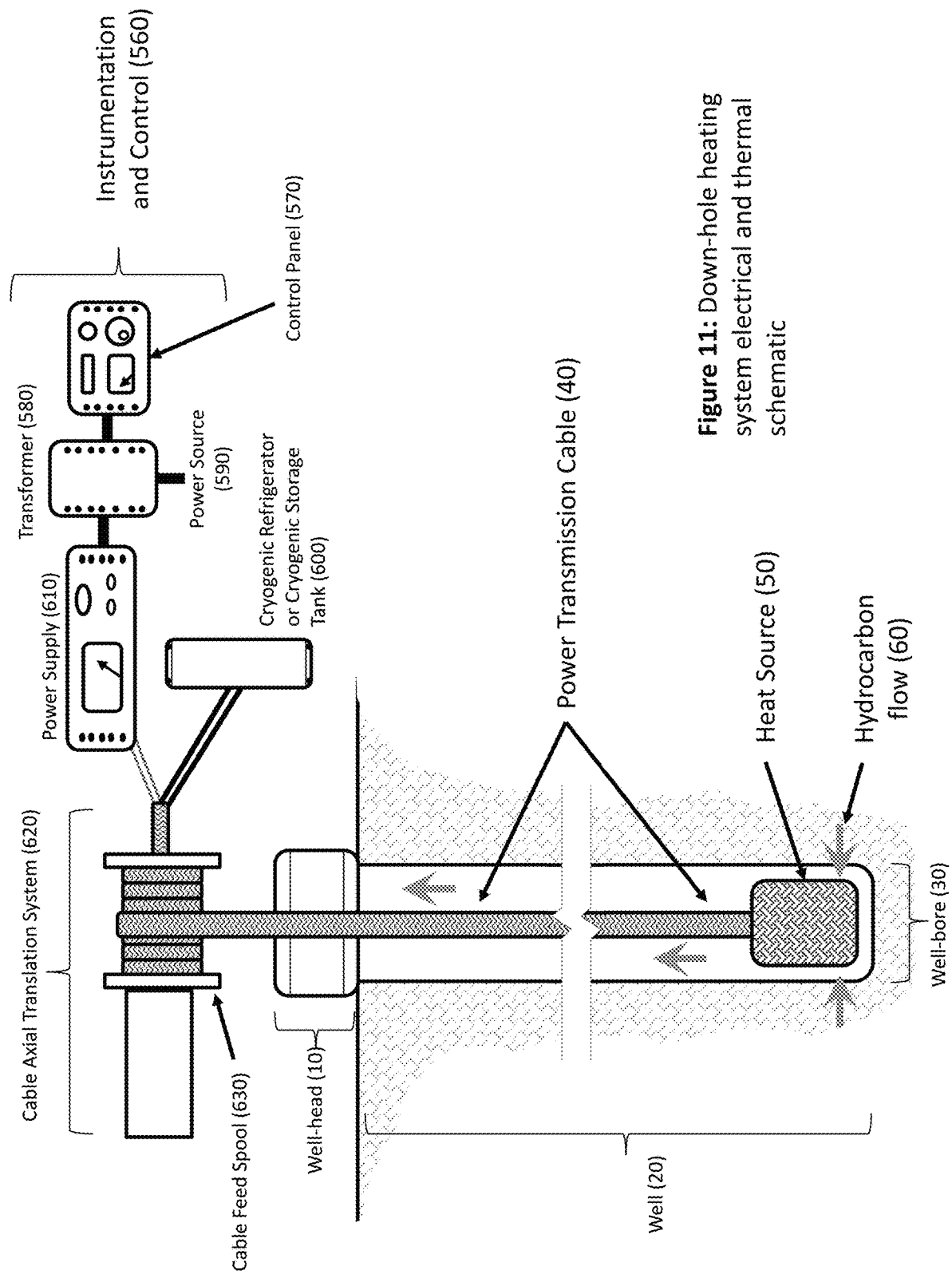
Figure 11: Down-hole heating system electrical and thermal schematic

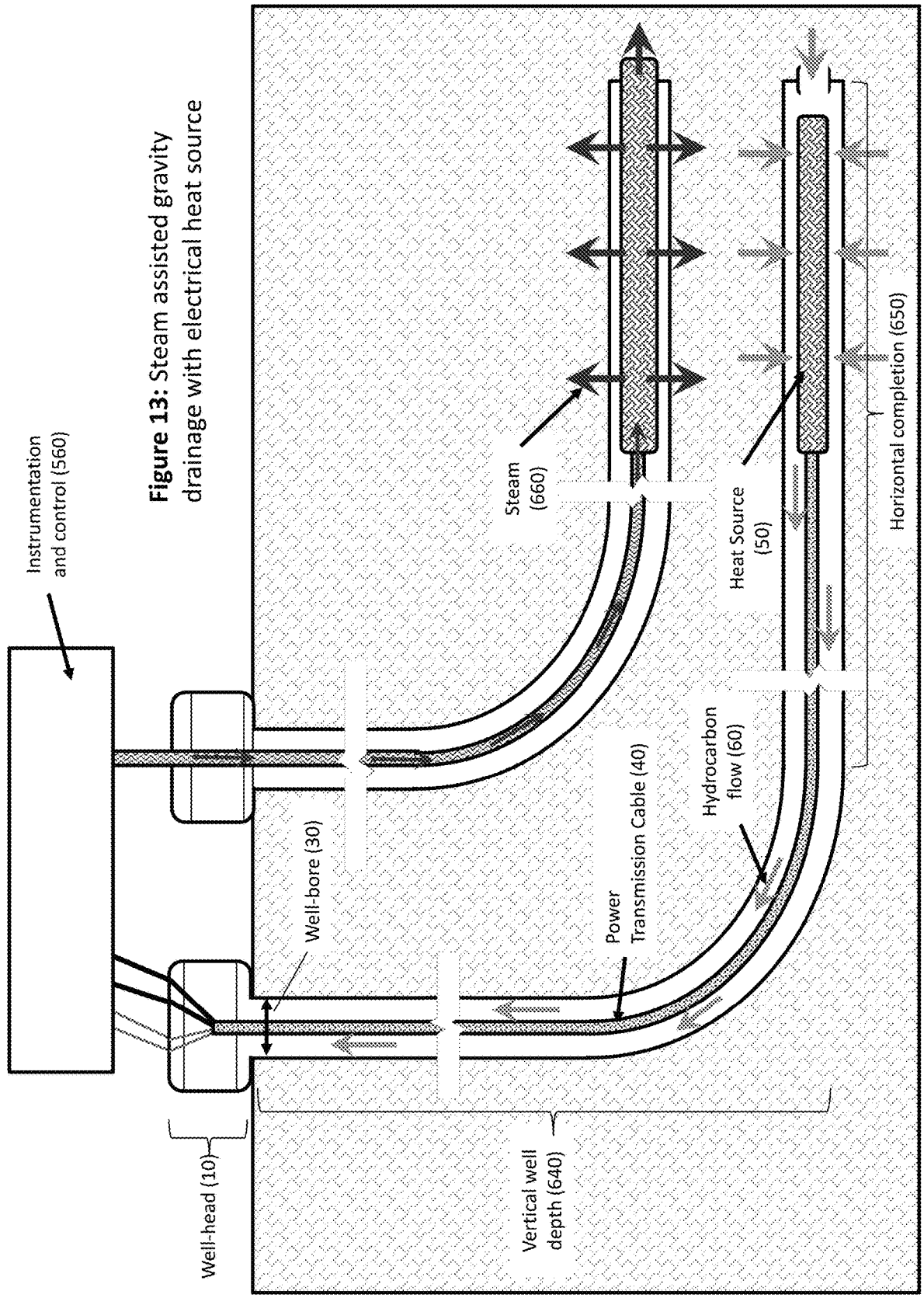
Figure 13: Steam assisted gravity drainage with electrical heat source

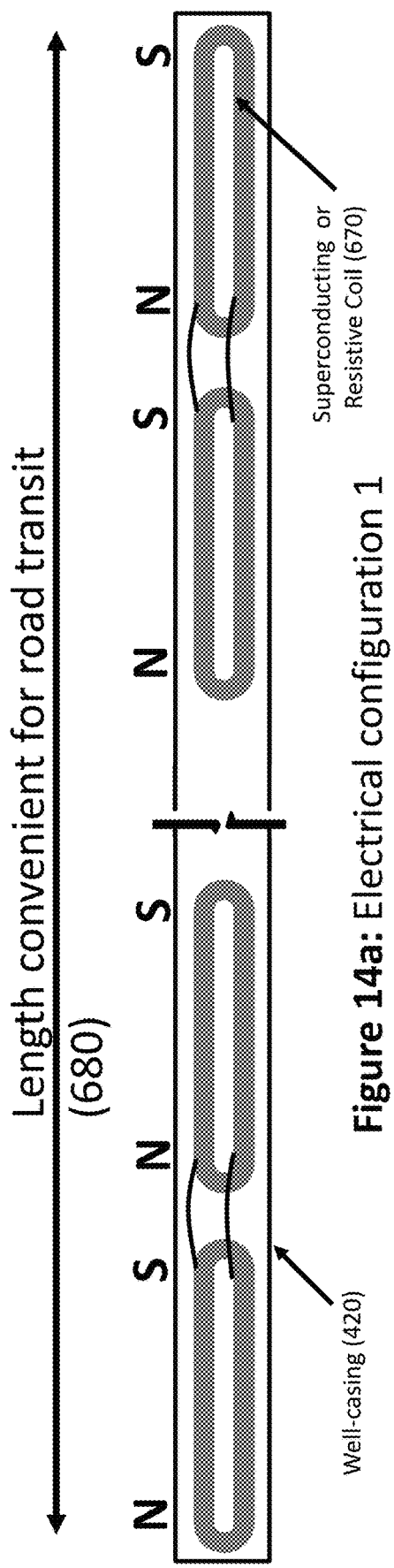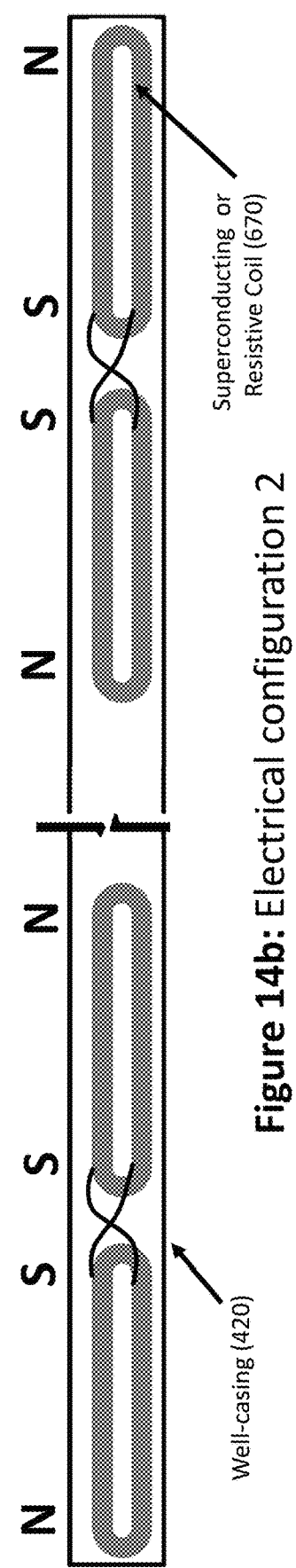
Figure 14a: Electrical configuration 1
Figure 14b: Electrical configuration 2

HIGH POWER DENSE DOWN-HOLE HEATING DEVICE FOR ENHANCED OIL, NATURAL GAS, HYDROCARBON, AND RELATED COMMODITY RECOVERY

FIELD OF THE DISCLOSURE

This disclosure relates to a heating system that is useful in the extraction of oil (e.g. bitumen), natural gas, hydrocarbons, and other related commodities from a subterranean reservoir. More particularly, this disclosure relates to a superconducting heating system, such as radiative, induction, or resistive heater that can placed within a well-bore and has the capability to generate significant heat. The additional heat lowers the viscosity of the surrounding fluid and raises the pressure making it easier to extract and thus enhancing the throughput. The use of electrical heat can also reduce the amount required or eliminate the use of steam in the extraction of oil from a subterranean reservoir.

This disclosure also relates to the transmission of large amounts of electrical power via a superconducting cable that is coupled to a plasma blasting probe which is used to fracture shale and rock and aid in the extraction of oil, natural gas, and other related commodities.

BACKGROUND

In the oil and gas industry, the introduction of heat into an oil reservoir is beneficial in removing the extracted fluid. This is especially true for reservoirs containing thick, heavy, waxy oil such as bitumen. The addition of heat helps to significantly lower the oil's viscosity making it far easier to flow and thereby increasing production throughput. There are several common methods that have been used in the practical implementation of this down-hole heating strategy including: steam injection, in-situ combustion, electrical resistive heating, and electrical inductive heating. Traditional electrical resistive and inductive heating systems have employed conventional non-superconducting power transmission cables electrically powered with AC current operating at ambient temperatures. Traditional inductive heaters have used non-superconducting coils operating at ambient temperatures. Traditional radiative heaters have used non-superconducting power transmission cable with non-superconducting antennas. One challenge is that, with ambient temperatures in the range of 300-600 degrees Fahrenheit, the heat from the heat source can cause depositions on the heat source, which in turn decrease thermal conductivity.

Steam Assisted Gravity Drainage (SAG-D) was developed in the 1980s by the Alberta Oil Sands Technology and Research Authority. By combining SAG-D with improvements in directional drilling technology, along with the corresponding increase in the cost of oil by the mid 1990's it was now cost effective to produce bitumen using this approach. In the typical SAG-D operation, two horizontal wells are drilled in the oil sands, one at the bottom of the formation and another about 5-m above it. These wells are typically drilled in groups off central platforms and can extend for miles in all directions. In each well pair, steam is injected into the upper well, where the heat caused by the steam injection melts the bitumen, which allows it to flow into the lower well, where it is pumped to the surface. The use of SAG-D have provided a major breakthrough in oil production technology. Since it takes about 1-1.5 GJ of energy to extract one 55-gallon barrel of oil, and there are about 6.1 GJ useful energy contained within that oil, the SAG-D method has about a 5-to-1 energy returned-on-energy-invested (EREI).

Conventional non-superconducting electric heating systems are being designed to reduce the use of steam in SAGD operations and to be able to access other formations where steam technologies aren't as effective such as oil-bearing shale formations. These electric heating systems take advantage of novel concepts and innovative solutions based upon proven resistive and electromagnetic heating technologies, including Enhanced Solvent Extraction Incorporating Electromagnetic Heating (ESEIEH), Electro Thermal Dynamic Stripping Process (ET-DSP), Thermal Assisted Gravity Drainage (TAG-D),[i,ii] and inductive heating of the oil well's steel casing.

[i] Rassenfoss, S. (2012). *Seeking More Oil, Fewer Emissions*. Journal of Petroleum Engineering, 34-41.
[ii] Sandberg, C., Hale, A., & Kovscek, A. (2013). *History and Applications of Resistance Electric Heaters in Downhole Field Applications*. SPE Western Regional & AAPG Pacific Section Meeting. Monterey, Calif.: SPE International.

In the oil and gas industry, induced hydraulic fracturing or hydro-fracturing is a technique in which typically water is mixed with sand and chemicals, and the mixture is injected at high pressure into a well-bore to create small fractures (typically less than 1 mm), along which fluids such as gas, oil, uranium bearing solution, and brine water may migrate to the well. Hydraulic pressure is removed from the well, then small grains of proppant (sand or aluminum oxide) hold these fractures open once the rock achieves equilibrium. The technique is very common in wells for shale gas and hard rock wells. This well stimulation is usually conducted once in the life of the well and greatly enhances fluid removal and well productivity, but there has been an increasing trend towards multiple hydraulic fracturing as production declines.

DEFINITIONS

These definitions are provided for clarity, and are not to be taken as binding for claim construction.
Antenna: Is a single antenna or multiple antennas
Cable: Is a single cable or multiple cables.
Coil: Is a single coil or multiple coils.
Conductor: Is a single round wire or multiple round wires or a single flat tape or multiple flat tapes, a single strand or multiple strands, among other objects.
EREI: energy returned-on-energy-invested
ESEIEH: Enhanced Solvent Extraction Incorporating Electromagnetic Heating
ET-DSP: Electro Thermal Dynamic Stripping Process
Heat source: Examples of heat sources include inductive, radiative, and resistive heaters.

One example for an inductive heat source, a superconducting coil is wound with superconducting conductor, powered with DC current, and spun or vibrated (i.e. linear displacement) with a motor within an electrically conducting well-casing. In this example, the well-casing will heat up due to induced eddy currents, but the superconducting coil will not, because it has no electrical resistance. A heat source may comprise multiple heat sources.

In another example for an inductive heat source, a superconducting coil is wound with superconducting conductor, powered with either single-phase or three-phase AC current, within an electrically conducting well-casing. In this example, once again the well-casing will heat-up due to the induced eddy currents, but the superconducting coil will not because it has no electrical resistance. A heat source may comprise multiple heat sources.

In another example for a resistive heat source, a non-superconducting resistive heating element is powered with either single phase AC, three-phase AC, or DC current. The resistive heat heating element heats up due to Joule heating and the heat is conducted radially outwards to heat the surrounding oil. A heat source may comprise multiple heat sources.

In another example for a resistive heat source, the oil itself is used as the electrically conducting medium. The electrical power source can be either single phase AC, three-phase AC, or DC power. As the electric flows through the electrically conductive oil medium, it heats the oil through Joule heating. A heat source may comprise multiple heat sources.

In another example for a radiative heat source, a superconducting antenna is wound with superconducting conductor and powered with high frequency AC current. In this example, the surrounding fluid and gas will heat up due to the radiation output from the superconductive antenna is absorbed by the surrounding media, but the superconducting antenna will not because it has little resistance. A heat source may comprise multiple heat sources.

There are many other types of heat sources not listed above and the limited number of examples given above is merely meant to demonstrate the versatility of the embodiments described in this disclosure and is in no way intended to limit application of the embodiments of the invention as claimed, which are directed to down-hole heating and their methods.

HTS: High Temperature Superconducting

LTS: Low Temperature Superconducting

Motor: Is a singular motor or multiple motors. A motor can be a DC or AC motor, an electric motor, magnetic motor, pneumatic motor, hydraulic motor, combinations thereof, among other types of motors Power Source: power sources include: single-phase AC power, three-phase AC power, DC power, or combinations thereof.

Re: Rare-Earth

SAG-D: Steam Assisted Gravity Drainage among other types of heavy oil extraction requiring the use of steam.

TAG-D: Thermally assisted gravity drainage

SUMMARY

This disclosure relates to an exemplary down-hole heating device that can be used in vertical, deviated, and horizontals wells to aid in the extraction of heavy oil (e.g. bitumen), natural gas, hydrocarbons, and other related commodities. The replacement of current state-of-the art conventional resistive (non-superconducting) power transmission cables with superconducting cables or cryogenically cooled non-superconducting cables allows for higher power transmission density, both per unit volume and per unit mass, with far greater transmission efficiency. Traditional non-superconducting electrical down-hole heaters have been limited to a few (1-3) MVA maximal heating capacity. The cryogenically cooled non-superconducting down-hole heating devices have to potential to increases the levels of power transmission 3-7 fold. Furthermore, the superconducting down-hole heating devices described in this disclosure have the potential to increase the levels of power transmission downhole by up to 50 fold. For example, a traditional state-of-the-art non-superconducting down-hole heating device operating at warm ambient temperatures, in an ~8-inch diameter wellbore, and powered by 3-phase AC current operates up to 8 kV and ~200 $A_{rms}$. This produces a power level of ~1.7*200 $A_{rms}$*8000V~2.7 MVA. An equivalent 3-phase AC superconducting down-hole heating device operating under the same geometrical constraints could operate at current levels of 4000 $A_{rms}$, voltage levels ~15 kV resulting is power levels of ~1.7*4000 $A_{rms}$*15000V~102 MVA. The additional power available down-hole offer many advantages over prior state-of-the art including the ability to generate 100% quality steam, in-situ, down hole.

The embodiments described within this disclosure are applicable to a wide variety of enhanced recovery operations including: viscosity reduction, wax mitigation, inhibiting hydrate formation, and increasing mobility of heavy oils/bitumen. For both the resistive and inductive down-hole heating systems, replacing resistive power transmission cables with a superconducting cable embodiment will allow for significantly longer length down-hole heating systems and thus lead to greater oil and natural gas production output per site, while the higher electrical efficiency will lower long term operating costs and reduce greenhouse emissions. For the induction down-hole heating systems, the replacement of conventional resistive coils operating at ambient temperatures with either superconducting coils or cryogenically cooled resistive coils will further increase power transmission density.

There are many significant advantages of this disclosure when using superconducting downhole electric heaters to assist in the production of hydrocarbon reserves including but limited to: (1) increase in oil production and flow by extending either/both the vertical and horizontal production lengths, (2) decrease in the amount of steam (energy), (3) decrease in the amount and water, (4) high power density heat supply for in-situ steam generation within the well bore, (5) optimized oil production, and recovery, (6) reducing the well pre-heat time required, (7) allowing the heating of the well to occur down-hole, while the above ground facilities are being constructed, (7) reduction of greenhouse gas emission by providing a more energy efficient heating system with superior EREI, and (8) extending the useful life of well site production, among other benefits.

The so-called "SAG-D is an example of a method of heavy oil extraction that could benefit from the increased electrical power density a superconducting down-hole heating system has to offer. As stated previously, in the SAG-D method steam is employed to initially heat the wells and get the oil sands hot enough to lower their viscosity and allow the oil to be extracted in the adjacent well. The use of (more energy efficient) electrical power reduces the amount of steam necessary for this to be accomplished. The more heat supplied by electrical power the less steam is required and hence a huge cost savings can be realized by the embodiments described in this disclosure. The use of conventional non-superconducting electrical heating methods in conjunction with steam can be far more energy efficient than using steam alone, as long as the length of the well is sufficiently short. As the length of the production wells extend longer and longer, it becomes more and more difficult to transmit enough electrical power down the well-bore to effectively heat the oil. Hence, superconducting power cables with their higher power density and more efficient transmission have the potential to significantly extend this length and positively impact the EREI for SAG-D and other types of heavy oil extraction, by reducing and possibly eliminating the use of less energy efficient and more costly steam. Reducing the amount of steam and hence energy and water used in SAG-D extraction has corresponding environmental benefits as well.

At present, it is difficult to directly convert water to superheated steam using conventional non-superconducting down-hole electric heating systems as the length of the production well-bore increases because their power density is too low. The significantly higher power density (i.e. heat deposition per unit volume) of the superconducting down-hole heating system described herein is capable of directly converting water to superheated steam in-situ down-hole over significantly longer production wells. This additional benefit will positively impact the EREI for SAG-D and other types of heavy oil extraction including but not limited to ESEIEH, ET-DSP, and TAG-D. Generating steam in situ can reduce the water and energy requirements of SAGD facilities on the surface, also reducing the pre-heat period prior to production.

The electromagnetic excitation can be supplied using one of four preferred heating techniques: a) AC excitation of one or more the coils or antennas, b) DC excitation of one or more coils while simultaneously mechanically rotating/vibrating the excited coil or coils, c) DC excitation of one or more of the coils while simultaneously mechanically rotating/vibrating an electrically conducting well-casing, or d) single or three phase AC or DC excitation of a non-superconducting resistive heating element. These electromagnetic excitation techniques may be combined. In some embodiments, the electrical power located above ground is transmitted down the well-bore via a superconducting or non-superconducting cable to either: a) an antenna (radiative heater), b) a coil (induction heater), or c) a resistive element (resistive heater). Thus, the heat to the surrounding area is deposited in one of three manners: a) radiatively via a high frequency antenna, b) inductively on the external well-casing via the excitation of the coil(s) or c) resistively via a resistive filament wound heat source. The heat deposited either radiatively via the antenna or inductively/resistively on the external well-casing raises the temperature of the surrounding fluid and gas which in turn lowers the fluid's viscosity and raises the pressure of the surrounding fluid and gas, facilitating extraction of product and increases throughput.

A superconducting down-hole radiative heater can comprise one or more superconducting or resistive antennas, one or more superconducting power transmission cables, a vacuum jacketed thermally insulating cryostat, a cryogenic cooling fluid, jacketed in a rugged non-magnetic, electrically insulating cylindrical conduit.

A superconducting down-hole induction heater can comprise one or more superconducting or resistive coil assemblies, one or more superconducting power transmission cables, a vacuum jacketed thermally insulating cryostat, a cryogenic cooling fluid, one or more magnetic cores, jacketed in a rugged non-magnetic, electrically insulating cylindrical conduit. An alternating magnetic field used to create an induction heating effect on the external casing can be generated by a coil, such as a resistive coil or a superconducting coil, using method such as: a) by powering the coil(s) with AC electrical current, b) by powering the coil(s) with DC current and mechanically rotating the coil(s) along their longitudinal axis, or c) powering the coil(s) with DC or AC current and rotating an electrically conducting tubular cylinder along its longitudinal axis, or combination of these.

A superconducting down-hole resistive heater can comprise one or more superconducting power transmission cables, a vacuum jacketed thermally insulating cryostat, a cryogenic cooling fluid, a compact low heat leak hermetic power feed through and an ambient temperature resistive heat source.

RELATED ART

In related art for down-hole heating systems, AC electrical power can be supplied via a non-superconducting transmission cable to a non-superconducting coil wound with conventional resistive windings such as copper, silver, or aluminum. From the related art, both the electrical power cable and the coil operate at warm ambient temperatures, see for examples: U.S. Pat. Nos. 3,119,917, 3,570,594, 4,532,396, 4,590,347, 5,523,546, 2,208,197 (Canadian), and U.S. Pat. No. 6,285,014, which are incorporated by reference in their entirety for the purposes of enablement. Furthermore, the related art operates with an AC electrical power source either exciting a non-superconducting coil with AC power in the induction heater or to a resistive filament wound heater. This is different than the present superconducting down-hole resistive or induction heater embodiments. The present AC induction heating embodiments, either operates: 1) an all superconducting transmission cable and superconducting AC excitation coil or coils, 2) a hybrid device comprised of a superconducting transmission cable and cryogenically cooled resistive AC excitation coil, or 3) another hybrid version comprising a superconducting transmission cable with a warm ambient temperature AC excitation coil. One embodiment is a resistive transmission cable and a superconducting coil although this embodiment is as practical or advantageous. A potential advantage of a superconducting AC induction heating device or an embodiment of one of the two hybrid superconducting induction heating devices over the related art is the large increase in power density both per unit volume and mass as well as the increase in transmission energy efficiency. The substantially higher power density of an all superconducting or hybrid device will enable longer length induction heating devices that will greatly enhance oil and gas throughput on a single well site by increasing the interval length as well as lower long term operational expenses. A hybrid superconducting induction heating device that utilizes a warm ambient resistive coil and a cold cryogenically cooled power transmission cable could also benefit from the use of a compact, low heat leak hermetic power feed through such as described by Marshall in application Ser. No. 12/231,767, which is incorporated by reference in its entirety for the purposes of enablement.

Most importantly, all of the related art for down-hole induction heating tools all utilize AC power excitation of the coil that through inductive coupling induce eddy currents on the well-casing, which cause the well-casing to heat. In the present embodiments, the well-casing can be heated by either supplying AC power via a superconducting power transmission cable to the coil or more uniquely by supplying both the power transmission cable and coils with DC electrical power, but while simultaneously mechanically rotating either the magnetic field coil or the well-casing itself, or a combination of both. By rotating either the coil or the well-casing or a combination of both, the coils can still be inductively coupled to the well-casing. Thus, AC induction current can also be generated which cause heating in the outermost well-casing. Supplying DC current, particularly for the superconducting power transmission cable and superconducting coil has many operational advantages including far higher power densities and lower internal losses.

In related art, U.S. Pat. No. 3,788,703 by Thorpe which is incorporated by reference in its entirety for the purposes of enablement, describes the fracturing of rock employing a plasma stream using non-superconducting resistive power cables.

DETAILED DESCRIPTION

Advantages of Superconducting Power Transmission Cable or Cables

The temperature dependent electrical resistance of a normal (non-superconducting) metal conductor is given by the relation: $R(T)=\rho(T)*L/A$, where $\rho(T)$ is the temperature dependent electrical resistivity which varies from material to material, L is the length of the conductor, and A is the conductor's cross sectional area. The electrical power loss ($P_{loss}$) in the non-superconducting transmission cable operating at a current ($I_{op}$) with electrical resistance ($R_{cable}$) is given by $P_{loss}=I_{op}^2*R_{cable}$. Thus, the power dissipated along the non-superconducting transmission cable is directly proportional to its electrical resistance (R) and hence its length (L). Major disadvantages in state-of-the-art conventional down-hole heating systems compared with a zero resistance superconducting down-hole heating system described in this disclosure become immediately apparent. First, electrical power dissipated as heat is lost along the length of the non-superconducting transmission cable when compared with the superconducting cable described in this disclosure. The power loss in the non-superconducting transmission cable is power that could otherwise have been deposited directly to the heat source to heat the surrounding heavy oil for its extraction. This decreases the overall electrical energy efficiency of the non-superconducting cable relative to the superconducting cable described in this disclosure. Second, in the non-superconducting power transmission cable the power loss is directly proportional to its length. The longer the power transmission cable, the higher the power loss along the non-superconducting cable. The electrical power loss in a superconducting power transmission cable, however, is near zero (or very small) and is independent of the length of the superconducting cable, thus it has a higher power density per unit length. This means that the length of the superconducting cable and hence the production zone can be made significantly longer. This enhances the hydrocarbon production capacity for a given well-bore. Third, if the length of the production area is extended to enhance hydrocarbon production rates either vertically, horizontally, or both, the generation of high quality 100% saturated steam above ground and subsequently transmitted below ground to the production zone becomes increasing difficult due to the loss of its latent heat, requires more water consumption, and is far less energy efficient. The higher power density (per unit volume) of the superconducting cable allows for the direct generation of high quality 100% saturated steam within the well-bore thus reducing/minimizing the loss of latent heat of the stream as it traverses from the above ground generation to below ground within the production area.

In one embodiment, a superconducting cable, or multiple superconducting cables, is used to transmit the electrical power located above ground to the heat source or heat sources located below ground. Superconducting cables have many advantages over conventional non-superconducting cables in terms of power density: a) per unit volume, B) per unit mass, and c) per unit length.

In one embodiment, the superconducting transmission cable, or cables, is comprised of round wires, flat tapes, or ribbons of High Temperature Superconducting (HTS) materials. In order to provide clarity, this disclosure uses to the more generic term "conductor" to mean a single round wire or multiple round wires, a single flat tape or multiple tapes, or other objects.

HTS materials come in four varieties: a) so-called first generation Bi—Sr—Ca—Cu—O, b) so-called second generation Re—Ba—Cu—O materials, where Re stands for Rare-Earth, c) so called iron-pnictides, or d) so-called iron-chalcogenides. The first two are cuprate type superconductors while the latter two are ferro-pnictides, where pnictides are materials made up from the chemical group 15 of the periodic table such as Arsenic (As) and Phosphorous (P) and ferro-chalcogenides made up from group 16 of the periodic table such as Selenium (Se) or Tellurium (Te). Superconducting transmission cables are discussed in more detail in provisional patent application No. 61/818,994 by Rey filed on May 3, 2013, which is incorporated by reference in its entirety for the purposes of enablement.

In another embodiment, the superconducting cable or multiple cables are comprised of Low Temperature Superconducting (LTS) materials. Common LTS materials used in superconducting cables include but not limited to: Nb, NbN, Nb—Ti, Nb—Sn, (Nb—Ti)Sn, Nb—Al, Mg—B, Mg—$B_2$ or chemically doped alloys thereof. There is no generally accepted definition of what temperature distinguishes HTS from LTS materials.

Non-Superconducting Cryogenically Cooled Power Transmission Cables

Down-hole electric heater power transmission cables have generally used single core monofilament or multi-stranded copper or aluminum cables to carry AC power down-hole in order to provide electrical power to inductive, resistive, or radiative heaters. Multi-stranded cables are generally preferable because of their enhanced mechanical flexibility over monofilament conductors and their ability to be twisted and transposed (e.g. litz wire) which helps to minimize ac losses. The AC power transmission cables generally operate at the ambient warm temperature of the surroundings. For the portion of the power transmission cable in closest proximity to the heat source, the electrical resistance of the cable can increase dramatically due not only to the joule heat generated in the cable itself, but also because of being in close proximity to heat given off by the heat source. This has the deleterious effect of reducing the net power delivered to the heat source as well as degrading the electrical insulation surrounding the power transmission cable which degrades with temperature. In this disclosure, many of the problems in conventional non-superconducting power transmission cables can be overcome by cryogenically cooling the resistive cables themselves. By cryogenically cooling the non-superconducting resistive cables more power can be delivered to the heat source located down-hole. Since the electrical resistance in a free-electron metal in general drops linearly with the temperature, there can be a substantial increase in the net power delivery to the heat source. Similarly, longer horizontal lengths or deeper vertical lengths or a combination of both could also be realized by cryogenically cooling the non-superconducting power transmission cables such as copper or aluminum. The increase in the amount of electrical powered delivered. For example, if a non-superconducting power transmission cable made of electrical grade copper or aluminum were cooled with liquid nitrogen (LN2), the electrical resistance of these metals decreases by about a factor of six to seven from its room temperature value. Considering that the joule heat generated in the cable is $P_{loss}=I_{op}^2R_{cable}$ as discussed above, if the electrical resistance ($R_{cable}$) were to drop by factor a about seven from cryogenic cooling to liquid nitrogen temperature (~77 K or −196 C), then the operating current ($I_{op}$) could increase by approximately sqrt(7) or ~2.65 to maintain the same level of losses. Hence the net power delivered to the heat source could be increased by ~2.65 at the same operating voltage. This of course is only approximate since if the power transmission cable were cooled in a flowing stream on LN2 coolant greater heat could be carried away by the flowing LN2 coolant and even higher operating currents and power deliveries could be achieved. If liquid hydrogen were selected at the cryogenic coolant, the electrical resistivity of copper or aluminum cables could be reduced even further. For example, if high purity aluminum ~99.99% or better were selected for the power transmission cable and subsequently cooled to the boiling point of liquid hydrogen (~20 K), the electrical resistance of the high purity aluminum would drop by more than a factor of 1000 at 20 K from its room temperature value. This could result in power deliveries>30 over its corresponding room temperature value Similarly, for the superconducting cable and superconducting coil as the heat source, the current carrying capacity of the superconducting wire dramatically increases by factors ranging anywhere from 3 to 10. This results is power densities of up 3-10 times higher than at liquid nitrogen temperatures. An additional advantage of using liquid hydrogen over liquid nitrogen for example is its high heat capacity compared to LN2 (445 J/gm versus ~198 J/gm) and relatively low cost when compared to other liquefied gases. Yet another advantage of using liquid hydrogen over liquid nitrogen for example as a cooling fluid is its relatively low material density, ~70.9 gm/l vs. 807 gm/l for LN2. This is important in down-hole heating applications where the subterranean portion of the down-hole system may exceed 1-2 km. Having a low material density reduces the head pressure thus reducing the pressure requirements on the cryostat vessel and generally making it easier to pump the coolant around the coolant circuit. Due to flammability issues associated with the use of hydrogen, caution would of course have to be used in its introduction, operation, and handling.

In one embodiment, the non-superconducting power transmission cable (e.g. copper or aluminum cable) is cooled with a cryogenic cooling fluid while the heat source operates at a warm ambient temperature. A compact low heat leak hermetic power feed-through electrically connects the non-superconducting power transmission cable operating at cold cryogenic temperature to the heat source operating at hot ambient temperatures. The heat source could be one or more non-superconducting coils inductively coupled to a well casing, an electric resistive heater, or a non-superconducting antenna. The cryogenic cooling fluid could be nitrogen, air, natural gas, methane, oxygen, argon, hydrogen, neon, helium, mixtures thereof, among other cryogenic cooling fluids. The cryogenic cooling fluid could be pressurized and sub-cooled to further reduce the temperature and hence lower the electrical resistance and reduce the chance of gas bubble formation. Gas bubbles have lower dielectric strength than the liquid pause and could lead to electrical breakdown under high voltage stress.

In another embodiment, both the non-superconducting power transmission cable and the heat source are cooled with a cryogenic cooling fluid. In this embodiment, the heat source could be a non-superconducting coil (e.g. copper or aluminum) or multiple non-superconducting coils inductively coupled to the well casing, although a superconducting coil or multiple coils could also be used if the superconducting transition temperature were higher than the operating temperature of the cryogenic cooling fluid.

In another embodiment, both the non-superconducting power transmission cable and the heat source are cooled with a cryogenic cooling fluid. In this embodiment, the heat source could be a non-superconducting antennal (e.g. copper or aluminum) or multiple non-superconducting antennae coupled to the surrounding hydrocarbons to be heated and extracted, although a superconducting antennal or multiple superconducting antennae's could also be used if the superconducting transition temperature were higher than the operating temperature of the cryogenic cooling fluid.

Non-Superconducting Power Transmission Cable or Cables

Down-hole heaters have generally used an alternating magnetic field inductively coupled to an electrically conducting well-casing to induce eddy currents on the well-casing and thus cause the well-casing to heat. Therefore, alternating current (AC) has been the obvious choice. However, using direct current (DC) power is far easier, safer, and more efficient to transmit power over long distances as is often necessary as down-hole heaters are often located far from the power source. DC power, however, will not generate an alternating magnetic field in a fixed non-rotating reference frame. DC power can generate an AC magnetic field (and hence induce ac currents that cause heating), by rotating the reference frame.

In one embodiment, a non-superconducting resistive cable is used to transmit DC electrical power to a non-superconducting resistive coil. The non-superconducting resistive cable and coil is comprised of round conductors, flat conductors, or ribbons of electrical conducting materials. Some common materials are: copper (Cu), tin (Sn) plated Cu, brass (CuZn), aluminum (Al), bronze (CuSn), silver (Ag), gold, alloys thereof, or other electrical conductors.

AC Electrical Power Source

In one embodiment, the electrical power is provided by a three-phase alternating current (AC) source. In another embodiment, the electrical power is provided by a single-phase AC source. Three-phase AC electrical power is preferred because it down not provide a load imbalance. Other multi-phase AC sources may be used. The voltage rating of the AC power source is preferably determined by the electrical impedance of the circuit that is configured to produce the desired heating effect. The frequency of the AC power source depends upon the type of heating system. An inductive down-hole heater generally uses lower frequencies closer to power frequencies typically ranging from 50 Hz to 1 kHz. A radiative down-hole heater generally uses much higher frequencies closer to the Radio Frequency (RF) band of the electromagnetic spectrum (e.g. 3 kHz to 300 GHz). When using AC electrical power for a down-hole induction or radiative heating device, the frequency of the AC excitation powering the superconducting cable can be specifically chosen to maximize the heat deposition into the electrically conducting well-casing (induction heater) or the adjacent surroundings (radiative heater), in order to maximize the recovered fluid.

In one embodiment for the induction heater, the heat deposition is maximized by calculating the so-called electromagnetic "skin-depth" of the well-casing and then matching the AC excitation frequency to that skin-depth. The skin depth of material depends upon the material's electrical conductivity, magnetic permeability, and thickness, so that the AC excitation frequency is selected to maximize the heat deposition on the external wall of the well-casing. The AC excitation frequency is typically 50 Hz or 1 kHz, but other frequencies both lower and higher are also possible depending upon the specifics of the design and application.

In one embodiment for the radiative heater, the heat deposition is maximized by selecting the frequency at which the material of the AC power is absorbed by the surrounding fluid. In this embodiment, it is important to either calculate or measure the impedance the transmitted, reflected, and absorbed power emanating from the antennas. This radiative heater is optimized when the reflected power is minimized and the absorbed power to the surrounding medium is maximized.

DC Electrical Power Source

In one embodiment, the electrical power is provided by a DC source. In this embodiment, DC current at a specified voltage rating is fed down the power transmission cable. The power transmission cable can either be superconducting or non-superconducting. A superconducting cable can be more efficient and transmit more power, whereas a non-superconducting cable can be less expensive to buy and install. The DC power from the transmission cable is used to either generate a DC magnetic field in the heat source. In one embodiment, the heat source is a superconducting coil, although a non-superconducting resistive coil can also be used. In another embodiment, the heat source is a heating element. The DC power can also be used to power and electric motor that mechanically rotates either the well-casing, coil, or both the well-casing and the coil.

Superconducting Cabling Geometry

In one embodiment, the superconducting cable geometry is a single-phase AC or a DC co-axial superconducting cable that is comprised of a superconducting phase conductor and a superconducting return shield that is separated by a dielectric material that is rated to withstand the desired voltage level. The single phase AC or DC co-axial superconducting cable is inserted in a single cryostat and operated cryogenically cold.

In another embodiment, the superconducting cable geometry is three-phase AC tri-axial conductor with a grounded return shield. The three separate phases comprising the tri-axial conductor are all wound on a concentric former with each phase separated by a dielectric material that is rated to withstand the desired voltage level. The grounded shield in a superconducting tri-axial cable can either be comprised of superconducting conductor or conductor or non-superconducting conductor since it carries significantly less current when all three phases are well balanced. There are three advantages of the three-phase superconducting tri-axial cable: a) since all three phases are balanced, the return shield carries significantly less current and can be made from less expensive copper conductor or significantly less superconductor that the phase conductor, b) the concentric geometry of three phases and the return shield allows for a very small conductor volume and hence a very high power density, and c) all three phases can be contained within a single cryostat sharing a common vacuum.

In another embodiment, the superconducting cable geometry is three-phase AC superconducting co-axial cable. Each superconducting phase conductor wrapped by a dielectric material that is rated to withstand the desired voltage level. Each superconducting phase conductor has its own superconducting return shield. For compactness, the three separate phases are typically arranged in a triangular shaped and sometimes referred to as a Triad design. This superconducting cable design is sometimes referred to as "three-cores-in-one." The advantages of this Triad or "three-cores-in-one" superconducting cable design are: a) the superconducting return shield allows for >95% cancelling of the stray magnetic field emanating from the superconducting cable and b) the triangular packing arrangement allows for the use of all three cores (i.e. phases) contained within a single cryostat. The disadvantage of this superconducting cable design over the more compact tri-axial design mentioned above is both the lower power density and it requires twice as much superconducting wire to provide the superconducting return shield.

In another embodiment, the superconducting cable geometry is three-phase AC superconducting co-axial cable. Each superconducting phase conductor wrapped by a dielectric material that is rated to withstand the desired voltage level. Each superconducting phase conductor has its own superconducting return shield. However, in this embodiment each superconducting phase is inserted into three separate cryostat. The advantage of this design over the previous two embodiments mentioned above (i.e. tri-axial and triad), is its simplicity and relatively straight forward ambient-to-cryogenic termination/bushing design. The disadvantages of this embodiment are: a) large foot print leading to low power density, b) the use of a superconducting return shield doubling the superconducting wire usage over the trial design, and c) the cost of three separate cryostats.

There are many possible cable architectures and geometries that could be used to fabricate the superconducting power cables. For the HTS cables such common examples are Cable-on-Round-Core (CORC), braided cables, twisted and transposed cables, stacked and twisted cables, triad, and triaxial cables. For the more flexible and ductile LTS conductors such as Nb—Ti and wind and react Nb—Sn, Nb—Al, and MgB2 there many types of cabling patterns that are known to lower AC loss including Litz and Rutherford cables. Cable architectures or geometries that minimizes fabrication costs, AC loss, and that are flexible are preferred.

Bi-Polar Superconducting Cabling Geometry

In one embodiment, the superconducting power cable comprises two separate conductors at two separate voltage potentials to form a bi-polar superconducting power cable. The two separate conductors comprise the input (+) and return (−) path for the current flow. The two separate conductors are electrically isolated from one another via electrical insulation. Each of the conductors is comprised of a single superconducting conductor or conductor or multiple superconducting conductors or conductors. The conductors that are comprised of multiple conductors or conductors are more mechanically flexible and electrically more stable than conductors with a single conductor or conductor. If the two separate conductors comprising the bi-polar power cable are twisted and transposed the loss in the superconducting power cable can be reduced under AC excitation.

Superconducting Coil(s) for the Induction Heat Source

In one embodiment, the heat source is superconducting coil that is fabricated with superconducting conductors. In this embodiment, the superconducting coils is wound with superconducting conductors with either the so-called first generation Bi—Sr—Ca—Cu—O superconducting materials or the so-called second generation Re—Ba—Cu—O materials, where Re stands for Rare-Earth. In one embodiment, both the electrical power cable and the AC excitation coil are both superconducting and operating in a single common cryostat with a common cryogenic cooling fluid. For an all superconducting induction heater, a potential advantage of having both the power transmission cable and the coil fabricated with superconducting materials is they both can share a common thermally insulating vacuum jacketed cryostat and share a common cryogenic cooling fluid. Having a common cryostat and cryogenic cooling fluid reduces complexity and costs. For an all superconducting induction heater the need for the compact, low heat leak electrical power feed through that transitions the AC electrical power supplied by the superconducting cable or cables to an ambient resistive coil within the confined space of the well bore is eliminated. An electrical power feed-through that connects the ambient temperature power source to the cold cryogenic superconducting transmission cable is preferred to be located above ground, where space and weight are less constrained than when located below ground within the confines of the well-bore.

Hybrid Superconducting Down-Hole Induction Heating Device

In one embodiment, a hybrid superconducting down-hole induction heating device is comprised of one or more superconducting power cables and one or more non-superconducting resistive coils. In one embodiment for a hybrid device, both the superconducting cable and the resistive coil are cryogenically cooled, operate at similar temperatures, and share a common cryogenic cooling fluid and a common thermally insulating vacuum jacketed cryostat. This eliminates the need for a compact, low heat leak ambient to cryogenic feed-through on the subterranean end of the device. An advantage of cryogenically cooling a non-superconducting resistive coil is that the coil can carry more current due to the decrease in electrical resistance at the lower temperatures.

In another embodiment of a hybrid superconducting down-hole induction heating device, only the superconducting cable is cryogenically cooled and the resistive coil is operated at ambient temperatures. One way to construct this embodiment of a hybrid device is with a compact, low heat leak ambient to cryogenic feed-through on the subterranean end of the device as well as a low heat leak ambient to cryogenic feed-through on the above ground end of the cable. The power feed-through located above ground need not be as compact as the one located below ground. An example of a compact, low heat leak ambient to cryogenic feed-through can be found in the Provisional patent application Ser. No. 12/231,767 filed on Sep. 5, 2008 by Marshall, which is incorporated by reference in its entirety for enablement.

Cryogenically Cooled Resistive Coil(s) for the Hybrid Induction Heat Source

In one embodiment, the AC electrical power is transmitted via a superconducting cable or cables to the AC excitation coil or multiple coils, where the AC excitation coil(s) is fabricated with conventional non-superconducting resistive conductor or conductor. Common resistive conductors or conductors are comprised of copper, aluminum, silver, gold, or alloys of these various metals. In this embodiment, one advantage is that the coil or multiple coils is fabricated with lower cost materials such as copper or aluminum. These resistive conductor and conductors are lower in capital costs than superconducting conductor and conductor. Another advantage of having both the superconducting power cable and the resistive coil cryogenically cooled is that it reduces cost and complexity by eliminating the need for a compact ambient (warm) to cryogenic (cold) electrical connection at the subterranean end of the down-hole induction heater. An additional benefit of the cryogenically cooled resistive coil is that the electrical resistance of the resistive coil is significantly reduced, when compared to ambient temperature operation, thereby reducing unwanted internal losses in the coil and thus allowing for greater power transmissions to the electrically conducting casing and greater fluid recovery per unit input power. The disadvantage of using a cryogenically cooled resistive coil over a superconducting coil is that the internal AC loss is deposited in the cryogenic fluid is much higher than it is for a superconducting coil.

Ambient Warm Resistive Coils(s) for the Induction Heat Source

In one embodiment, the heat source is an AC induction coil that is fabricated with conventional non-superconducting resistive conductor. Common resistive conductors are comprised of copper, aluminum, silver, gold, or alloys of these various metals. In this embodiment, the advantage of having an ambient resistive AC excitation coil is that it is lower in cost than a superconducting coil and does not have to be cooled to cryogenic temperature. If conventional resistive coil is operated at warm ambient temperatures then conventional coils designs such as those disclosed in Beck et al (U.S. Pat. No. 6,285,014) hereby incorporated by reference in its entirety for enablement can be employed, while still enjoying the advantage of the increased power transmission density of the superconducting transmission cable described in this embodiment. The disadvantage of this embodiment is two-fold: a) it requires a compact ambient (warm) to cryogenic (cold) electrical connection at the subterranean end of the down-hole induction heater to transmit the power from the superconducting cable to the resistive coil and b) increased input power is required to power the resistive coil compared to either the superconducting coil or the cryogenically cooled resistive coil.

Non-Inductive or Bi-Filar Winding for the Induction Heat Source

In one embodiment, the heat source is either a non-superconducting resistive coil or a superconducting coil that is non-inductively wound. This type of non-inductive winding configuration has many different names including bi-filar type winding and alternating north-south pole winding. The advantage of this type of winding over a more common inductive winding is that the AC inductance of the coil is far lower thereby reducing the AC impedance of the coil. Reducing the AC impedance of the coil becomes increasingly important as the AC excitation frequency is increased; the number of turns increased and/or the coils axial length is increased. Another advantage of this type of winding is that for a down-hole heating device comprised of multiple coils placed adjacent to another along the longitudinal axis, the ends inductively couple better to the well-casing insuring a more uniform heat deposition and temperature uniformity. The number of alternating north-south poles in the non-inductively wound coil can be adjusted as necessary.

In another embodiment, a conventional inductive type coil winding technique is used. This type of winding is advantageous for DC coil excitation in which either the coil is mechanically rotated or the electrically conductive well-casing is rotated at a specified frequency.

Multiple Coils for the Induction Heat Source

For the inductive heater, the heat source is typically comprised of at least one coil or more often of multiple coils. The coil or multiple coils are electromagnetically coupled to the well-casing so as to induce eddy currents and hence generate heat. Since there are typically many coils that are necessary to comprise the heat source it is helpful to identify the various types. The two most common type of multi-coil arrangements are: 1) multiple coil arrangements that are longitudinally spaced along the central axis of the heat source in order to extend its effective heating length and 2) multiple coil arrangements that are triangular spaced and electrically powered by a three-phase AC power source.

First for the longitudinally spaced coils, when the electrical power source is either a single-phase AC source or a DC source it is common to electrically connect the power transmission cable to a single coil. However, the heat source for a down-hole heater introduced into a commercial well must often be very long in length ranging anywhere from tens of meters to several hundreds of meters. Thus, it is not practical to wind a single coil that is tens or several hundreds of meters in length. The more common technique is to wind multiple coils that are all electrically connected in series and placed along the longitudinal axis of the heater to form a much longer coil (in the axial direction) and hence longer in length heat source. It is often useful to package these multiple coils in unit lengths of about 10-20 m, so that they can be easily transported by rail or tractor trailer.

The second type of multiple coil arrangement is used when the electrical power source is three-phase AC. Here the most common geometry is to space three separate coils in a triangular sharped array where each of the coils is powered by each separate phase. Other stacking geometries are possible but not as commonly used. Once again, in order to extend the effective length of the heat source from tens up to several hundreds of meters in length, the most practical approach is to sub-divide the axial length into multiple three-phase coil sections with each section electrically connected in series to the next. It is often useful to package these multiple coils in unit lengths of about 10-20 m, so that they can be easily transported by rail or tractor trailer.

In one embodiment, the heat source is comprised of multiple coils continuously wound and electrically connected in series rather than a single coil. In this embodiment, a spacer or multiple spacers separates the adjacent coils from one another. The multiple coils are linearly aligned along the central longitudinal axis of the heating device. The multiple coils can either be spliced together via an electrical splice such as solder, or they can be continuously wound using a single piece length of wire. It is preferred that the spacer or multiple spacers separating the adjacent coils is electrically insulating and non-magnetic, although an electrically resistive non-magnetic spacer could be used. The advantage of having an electrically insulating, non-magnetic spacer is that during ac excitation of the multiple coils, no heat is lost by being deposited on the spacer instead of the well-casing. The advantage of multiple coils linearly aligned along the central longitudinal axis separated by a spacer over just a single coil is that the down-hole heating device is more flexible and able to maneuver within the tight confines of the well-bore. The well-bore may be vertical, deviated, horizontal or a combination of these, so a less rigid and more flexible down-hole heating device is preferred. In this embodiment, it is preferred that the adjacent coils alternate north-south poles to provide better inductive coupling to the well-casing in the end regions of the multiple coils.

Layer Wound or Pancake Wound Coils for the Induction Heat Source

In one embodiment, the coil is wound using the layer wound, screw, or spiral winding technique. In another embodiment, the coil is wound using the single pancake or double pancake winding technique. Although slightly more complicated than the single pancake winding, the double pancake winding technique is preferred over the single pancake winding because it reduces the total number of splices by two and eliminates the electrical splice connection located on the inner bore and places it more conveniently on the outer diameter where it is more readily accessible and in a lower magnetic field region, which is advantageous for the superconducting coil. See for example, Y. Iwasa, *Case Studies in Superconducting Magnets*, Plenum Press: New York, (1991), which is incorporated in its entirety for enablement.

Electrical Insulation for the Cables and Coils

The electric power (P) transmitted by the cables to the heat source (i.e. antenna, coil, or resistive heating element) is a function of both the current (I) flowing in the device and the applied voltage (V), where P=I*V. Therefore, to maximize the power density of the down-hole heating device it is not only important to transmit very high currents but it is also important that the applied voltage be as high as possible. To have high voltages the electrical insulation used in the cables, antennas, coils, heating elements should have a high dielectric strength value and be able to survive the harsh operating conditions.

In one embodiment, the conductors that comprise the superconducting power transmission cables, superconducting coils, and/or cryogenically cooled resistive coils are covered with cryogenically compatible electrical insulation. The electrical insulation on the conductors, or conductors, prevents electrical shorting between conductors or conductors. There are many types of cryogenically compatible insulations including: poly(4,4'-oxydiphenylene-pyromellitimide) sold under the trademark Kapton, polytetrafluoroethylene (PTFE), sold under the trademark Teflon by DuPont, s-glass, e-glass, epoxy, flame-resistant meta-aramid sold under the trademark nomex by DuPont, polyvinyl form resin, and other insulating materials. There are also many ways in which the electrical insulation can be applied to these conductors and/or conductors including: spiral wrapping with overlap, butt-wrapping with no overlap, co-winding, covering with heat shrinkable tubing, extrusion, dip coating, spray coating, plasma flame spray coating, and other insulating methods. Combinations of these methods may also be used.

In other embodiments, the non-superconducting resistive cable and/or the non-superconducting resistive coil operating at warm ambient temperatures a cryogenically compatible electrical insulation is not necessary. Instead, lower cost ambient temperature electrical insulations can be used including: PVC, silicon rubber, glass, mineral oil, and other insulating materials Coil Shapes for the Induction Heater In one embodiment, the coils are flat elliptically shaped racetrack coils, with major and minor axes. In some cases it can be beneficial to bend the coils at the ends of the racetrack out of plane to form a "saddle" shaped coil. One of the benefits of non-planar saddle shaped coils is that they allow for simplified placement of a rotating shaft down the center of the coil, which is beneficial when the coil is rotated about its major axes. The number of axial and radial turns and the aspect ratio of the major to minor axes of the elliptically shaped racetrack or saddle coil is preferably optimized to enhance the electro-magnetic coupling to the well casing that is being inductively heated.

In another embodiment, the coil are cylindrically shaped solenoid coils. The number of axial and radial turns and the aspect ratio of the coil length to the coil diameter is preferably optimized to enhance the electro-magnetic coupling to the well-casing that is being inductively heated.

In another embodiment, the coil is comprised of either single pancake or double pancake coil electrically connected in series.

RF Antennae for the Radiative Heater

A down-hole heater with an RF antenna as the heat source has been recently disclosed in U.S. Pat. No. 8,674,274 by Parsche and it is incorporated by reference in its entirety for the purposes of enablement. In the patent published in US 2014013044 by Parsche, a down-hole heater with a superconducting RF antenna has been disclosed it is incorporated by reference in its entirety for the purposes of enablement.

In one embodiment, the superconducting coil is replaced with either a superconducting antennae or a non-superconducting resistive antenna operating at much higher frequencies closer to the radio frequency (RF) band and higher of electromagnetic excitation, which can range anywhere from about 3 kHz to 300 GHz. One advantage of this embodiment is that the heat can be deposited radiatively into the surrounding fluid and gas instead of on the well-casing, so that the radiated heat directly heats the surrounding fluid itself. It is important to match the transmission frequency of the AC excitation of the superconducting or non-superconducting antennae with the maximum absorption frequency of the surrounding fluid. To maximize the heat absorption in the surrounding fluid, it is important to initially measure the ac impedance of the circuit as a function of frequency in the presence of the surrounding fluid to be extracted and look for frequencies of highest absorption and least reflection. In this embodiment, the down-hole heating concept is similar to that of a microwave oven where an antenna emits electromagnetic radiation and the food or drink in the microwave oven, absorbs that radiation and the molecules in the food or drink and become excited and heat as a result of this energy absorption. In this situation, the radiation heats the fluid or gas instead of food or drink, and the target surrounds the heater rather than being inside an oven. An advantage of this embodiment over either the induction heater or resistive is the very high energy efficiency of the heating process and direct heating of the surrounding fluid and gas.

Antennae Geometries for the Radiative Heater

In one embodiment, the antenna is a simple sinusoidal lobed shaped dipole antenna although many other geometries are possible including: simple loop, bowtie dipole, folded dipole, long periodic dipole, omni-direction dipole, directional antennas, spiral, fractal and other configurations. In may be advantageous to stack several antennas together such as a vertical stack of spiral antennas.

Crystalline, Semi-Crystalline, or Amorphous Substrates for the Radiative Heater

In various embodiments, a superconducting antenna can be comprised of a superconducting thin or thick film or coating that is deposited or grown on an electrically insulating crystalline, semi-crystalline, or amorphous substrate. As the AC excitation frequency increases, metallic substrates even highly resistive ones such as stainless steel, the high performance alloys sold under the trademark hastelloy by Haynes International, etc. become increasingly lossy at frequencies above about 10 kHz. At these higher frequencies, the transmitted power is absorbed as heat in the radiating antenna rather than the target surrounding fluid, necessitating the use of electrically insulating substrates. The electrically insulating crystalline, semi-crystalline, or amorphous substrate can be in the form of a flat conductor or ribbon, a round or elliptically shaped fiber, or any other shape as a result of the substrates fabrication process. The crystalline or amorphous substrate is used because of its low dielectric losses when subjected to high frequency AC excitation especially in the RF range of 3 kHz to 300 GHz. The type of substrate materials used for the antenna will also depended upon the type of superconducting film that is deposited or grown on the substrate. Each combination of fluid and gas will have different AC impedance values. It is best to measure the ac impedance of the entire RF circuit including the antenna in the presence of the surrounding fluid and gas to determine the frequencies of maximum absorption by the surrounding fluid.

In one embodiment, the superconducting thick or thin film is a coating of MgB2 or chemically doped Mg—B. Suitable substrates materials for Mg—B should be able to survive the high reaction temperatures which are required to form the superconducting phase. These temperatures range from approximately 600° C. to 900° C., but should not chemically poison the reaction. There are many types of crystalline, semi-crystalline, or amorphous, that could be Possible substrates include: C, SiC, Al2O3, Si, YSZ, MgO, SrTiO3, LSAT, and other high temperature fibers, conductors, and ribbons. A thin barrier layer can be used between the substrate materials and the Mg—B to prevent chemical reaction and promote Mg—B nucleation and growth.

In another embodiment, the superconducting film is a coating of Re—Ba—Cu—O that has been epitaxial grown on an electrically crystalline, semi-crystalline, or amorphous substrate. Suitable substrates materials for Re—Ba—Cu—O should be able to survive the high reaction temperatures which are preferred to form the superconducting phase. These temperatures range from approximately 700° C. to 900° C., but should not chemically poison the reaction. Possible substrates include: Al2O3, YSZ, MgO, LaAlO3, NdGaO3, LSAT, SrTiO3, and other high temperature fibers, conductors, and ribbons. A combination of thin buffer and barrier layers can be used between the substrate materials and the Re—Ba—Cu—O to prevent chemical reaction, promote nucleation and epitaxial growth of the ReBCO crystal structure.

Cryostat

In the superconducting down-hole heating device, a cryostat is necessary to contain the cryogenic fluid that cools the superconducting power transmission cable, superconducting coil, or in some configurations both the superconducting power transmission cable and coil. The cryostat is essentially a thermos bottle that thermally isolates the cold cryogenic fluid from the warm ambient environment. The warm ambient environment can get quite hot (>300° C.) as the heat generation is required to get the thick waxy oil (bitumen) flowing. It is important for the down-hole heating device to make the cryostat electromagnetically transparent from heat source when the heat source during AC or DC excitation, so that NO electromagnetic radiation is absorbed or induced electrical currents flow on the wall of the cryostat.

In one embodiment, the cryostat is a multi-walled vacuum jacketed pipe that provides excellent thermal isolation or thermal insulation of the cold cryogenic fluid from the ambient temperature surroundings. This multi-walled pipe can be made flexible by corrugating the multi-walled tubing. In another embodiment, the cryostat is comprised a both a rigid section and a flexible section. In this embodiment, straight rigid vacuum jacketed piping is used for the cryostat in the section of the well-bore that is vertical or nearly vertical and flexible vacuum jacketed piping is used in the section requiring turns, bends, and contours.

In another embodiment, the cryostat is a multi-walled vacuum jacked pipe that is not corrugated but instead comprised of two or more-straight walled pipes separated by vacuum and wrapped with multi-layer insulation. It is often advantageous to separate the multi-wall pipes by thermally insulating spaces periodically placed along the axial length. The advantage of the straight walled cryostat vessel (i.e. piping) over the corrugated cryostat vessel is lower fabrication costs and lower heat leak per unit length. The disadvantage of the straight walled cryostat over the corrugated cryostat is the loss of mechanical flexibility. For the down-hole heating application, where the transition from the vertical well-bore to the horizontal well-bore occurs over a very gradual arc length and relatively a long distance, the higher flexibility provided by the corrugated wall cryostat may not be necessary in all applications and oil production sites.

In one embodiment, the superconducting cable and/or the superconducting coil or non-superconducting resistive coil is contained in a non-magnetic, electrically insulating vacuum cryostat. The vacuum cryostat can either be fabricated from corrugated material to increase mechanical flexibility or from straight pipe where less mechanical flexibility is required. For an induction heater, it is very important to choose a material for the vacuum jacketed cryostat housing to minimize heat deposition into the wall of the cryostat. In one embodiment, the non-magnetic cryostat is also electrically non-conducting so as not to absorb any eddy current heating. Materials such as polyetherimide, fiber reinforced plastic, nylon, PTFE, etc. can comprise the cryostat. In another embodiment, the cryostat is made with a corrugated non-magnetic stainless steel for enhanced flexibility. In yet another embodiment, the majority of the length of the cryostat is comprised of flexible, corrugated, non-magnetic, stainless steel, while just a short portion containing the induction heat source is fabricated with electrically insulating material. The challenge for using both the flexible, corrugated, non-magnetic, stainless steel with the electrically insulating cryostat section is ensuring a leak tight seal where the two mate together. In other embodiments, non-vacuum insulating cryostats using foam or aerogels can be used, however, these typically have significantly higher heat loads per unit length than conventional vacuum jacketed cryostats.

In one embodiment, the cryostat has a circular cross section although other cross sectional shapes configuration are possible, e.g. hexagonal, rectangular, square, elliptical, etc.

The cryostat can be used in either the radiative heater embodiment, the resistive heater embodiment, or the inductive heater embodiment.

Magnetic Permeable Core

In various embodiments, a superconducting coil or a non-superconducting resistive coil is wound around a magnetic permeable core such as Fe, Ni, Co, low carbon steel, alloys thereof, or other magnetic permeable material. There are many low carbon steels that are suitable for cryogenic operation such as A286, 1010, 1018, 1025, or other cryogenically compatible steels. For ambient temperature operation a common transformer steels are Si—Fe steels such as M-19. The advantage of winding a coil (both superconducting and non-superconducting) around a highly permeable magnetic core is that this reduces the required number of ampere-turns in the coil and hence fewer conductor are required to achieve the same magnetic field and hence a given amount of heat. Typical magnetic permeable cores saturate around 1-1.7 T, so if substantially higher magnetic fields are desired, the magnetic cores should not be implemented. Reducing the amount of conductor used to wind the coil is particularly advantageous when the coils are superconducting because the superconducting conductor/conductor cost can be expensive.

In another embodiment, the magnetic permeable core is made from thin laminated plates of magnetic permeable material such as Fe, Ni, Co, low carbon steel, alloys thereof or other magnetic permeable materials. The thin laminated plates are coated with electrical insulating materials that electrically isolated the lamination from its adjacent neighbor. Thin coated laminated magnetic cores are preferred over solid magnetic permeable cores when the superconducting coil or the non-superconducting resistive coil is powered with AC current.

Laminating and electrically isolating the magnetic permeable cores reduces both the hysteretic and eddy current losses in the cores and avoids unwanted heating in the magnetic permeable core. The stacked, coated, laminated magnetic permeable plates need to be fastened together. There are many methods to fasten the stacked, coated, laminated plates together including: encapsulating the magnetic core in epoxy, axial tension rods that span the length of the core and are tighten at each end by threaded components, or a combination of these fastening methods.

Rotating Field Coil for the Induction Heater

Conventional non-superconducting cables can be used to transmit AC electrical power from the electrical power source located above ground down the well-bore to a non-superconducting resistive coil. The AC magnetic field generated by the non-superconducting coil then induces currents that flow on the external well-casing, which in turn become hot from the flowing currents. However, a similar heating effect on the external well-casing can be obtained by supplying the same non-superconducting conventional cable(s) and coil(s) with DC current (instead of the typical AC current) and instead mechanically rotating either the conventional coil(s) or the external well-casing, or combination of both (in opposite directions). Thus, the AC magnetic field necessary for induction heating is generated by the DC current source and mechanical rotation of either coil(s) or well-casing, or a combination of both.

In one embodiment, a superconducting coil or a non-superconducting resistive coil is powered with direct current (DC) and not AC current. The alternating magnetic field that is used to inductively heat the outer tubular well-casing and its surroundings is generated by rotating the coil instead. The rotating coil creates an alternating magnetic field on the well-casing that inductively heats the casing and its corresponding surroundings. The significant advantage of this type of induction heater is that both the power transmission cable and the coil can be powered with DC current and not AC current. This significantly lowers the transmission loss in the cable and is safer to use. In fact, if both the power transmission cable and the coil are fabricated with superconducting materials (e.g. Re—Ba—Cu—O, Bi—Sr—Ca—Cu—O, Mg—B2, Nb—Ti, Nb—Sn, etc.), the power cables and the DC excitation coil will have zero DC electrical resistance and hence operate with 100% efficiency less the cryogenic cooling losses, which are typically less than 1% of the total input power. The disadvantage of this type of AC magnetic field generation is that the coil must be rotated within the subterranean well bore. One way to implement this is a rotating shaft along the axis of rotation of the coil and a motor to rotate the shaft. The preferred coil shape for a single rotating field coil is either the flat elliptically shaped racetrack coil or the elliptically shaped saddle coil although it is also possible to rotate the cylindrically shaped solenoid coil about its longitudinal axis.

In another embodiment, the superconducting power cable and non-superconducting resistive coil is powered with DC current but the non-superconducting resistive coil is operating at an ambient temperature and not a cryogenic temperature. This hybrid arrangement has two disadvantages: a) it requires a compact ambient (warm) to cryogenic (cold) electrical connection at the subterranean end of the downhole induction heater to transmit the power from the superconducting cable to the resistive rotating coil and b) it also requires a rotating shaft coupling.

Vibrating the Field Coil for the Induction Heater

In the previous section of this disclosure, it was disclosed that energizing the field coil with DC current and subsequently mechanically rotating the field coil, well casing, or both could generate heat by inducing eddy currents on the well casing. A similar heating effect can be obtained by vibrating (i.e. linear displacing) the field coil, well casing, or both at a specified vibration frequency or multiple frequencies. Thus, the AC magnetic field necessary for induction heating is generated by the DC current source and the mechanical vibration of either coil(s) or well-casing, or a combination of both.

In one embodiment, a superconducting coil or a non-superconducting resistive coil is powered with direct current (DC) and not AC current. The alternating magnetic field that is used to inductively heat the outer tubular well-casing and its surroundings is generated by vibrating the field coil instead. The vibrating coil creates an alternating magnetic field on the well-casing that inductively heats the casing and its corresponding surroundings. The magnitude of the heating depends upon several factors including but not limited to: the amplitude of the vibration (i.e. its linear displacement), the vibration frequency, and how well the field coil is inductively coupled to the well casing, among other factors. The significant advantage of this type of induction heater is that both the power transmission cable and the coil can be powered with DC current and not AC current. This significantly lowers the transmission loss in the cable and is safer to use. In fact, if both the power transmission cable and the coil are fabricated with superconducting materials (e.g. Re—Ba—Cu—O, Bi—Sr—Ca—Cu—O, Mg—B2, Nb—Ti, Nb—Sn, etc.), the power cables and the DC excitation coil will have zero DC electrical resistance and hence operate with 100% efficiency less the cryogenic cooling losses, which are typically less than 1% of the total input power. The disadvantage of this type of AC magnetic field generation is that the coil(s) must be vibrated within the subterranean well bore. One way to implement this is a vibrating shaft along the central axis of the coil(S) and a motor to vibrate the shaft. The preferred coil shape for a single vibrating field coil is either the flat elliptically shaped racetrack coil or the elliptically shaped saddle coil although it is also possible to vibrate the cylindrically shaped solenoid coil about its longitudinal axis.

In another embodiment, a superconducting power cable is configured to operate cryogenically cold with a non-superconducting resistive coil configured to operate at warm ambient conditions. Both the superconducting cable and the non-superconducting coil are powered with DC current. A compact, low heat leak cryogenic connection is used to mechanically couple and electrically connect the superconducting cable with the non-superconducting coil. The non-superconducting coil is vibrated at a specified frequency or multiple frequencies relative to the inductively coupled well casing. This hybrid arrangement has two disadvantages: a) it requires a compact ambient (warm) to cryogenic (cold) electrical connection at the subterranean end of the down-hole induction heater to transmit the power from the superconducting cable to the resistive vibrating coil and b) it also requires a shaft coupling.

Rotating Well-Casing for the Induction Heater

In one embodiment, both the superconducting cable and the superconducting coil is fed with DC electrical power (not AC). The use of DC electrical power reduces the internal AC losses of both the cable and coils making the entire down-hole induction heating system far more energy efficient, thereby lowering long term operating costs and reducing greenhouse emissions. In one embodiment, the both the superconducting cable and the superconducting coil are stationary and not rotating. The alternating magnetic field is instead generated by mechanically rotating the well-casing at a specified rotational speed. The faster the rotational speed the greater the induction currents developed on the well-casing, however, the faster the well-casing rotates the more susceptible it is to off-axis rotation causing deleterious wobble. In this embodiment, it is preferred that the well-bore tubular casing be electrically conducting or electrically conducting and magnetically permeable.

In another embodiment, the down-hole induction heater is a hybrid design comprised of a superconducting power cable and a non-superconducting resistive magnetic field coil. The magnetic field coil can either be cryogenically cooled with the same cryogenic fluid cooling the superconducting cable or it can be operated at warm ambient temperature by feeding the electrical power on the subterranean side of the down heater via a compact hermetic vacuum power feed-through.

In another embodiment, both the power transmission cable and magnetic field coil are fabricated with resistive non-superconducting conductor or conductor such as copper or aluminum and are operated at warm ambient temperature. In this embodiment, what distinguishes it from others is that both the power transmission cable and magnetic field coil are powered with DC electrical current and the induction heat is generated by mechanically rotating the electrically conducting well-casing relative to the field coil. The inductive heat is generated by the electromagnetic coupling between the rotating well-casing and the stationary field coil.

Vibrating Well-Casing for the Induction Heater

In the previous section of this disclosure, it was discussed that energizing the field coil with DC current and subsequently mechanically rotating the well-casing relative to the field coil could generate heat by inducing eddy currents on the well-casing. A similar induction heating effect can be obtained by vibrating (i.e. linear displacing) the well-casing relative to the field coil or both vibrating the field coil and well-casing at a specified vibration frequency or multiple frequencies. Thus, the AC magnetic field necessary for induction heating by electromagnetic coupling to the well-casing is generated by the DC current source and the mechanical vibration of either coil(s) or well-casing, or a combination of both.

In one embodiment, the well-casing is vibrated at a specified fixed specified frequency or multiple different frequencies relative to the field coil which is energized with DC current. The field coil can be one or more superconducting coils, one or more non-superconducting coils, or combinations thereof, configured to operate either cryogenically cold or at warm ambient temperatures.

In another embodiment, both the well-casing and the one or more field coils (excited with DC current) are vibrated at a specified fixed frequency or multiple frequencies, but in opposite directions to each other.

Rotating Well-Casing and Field Coil for the Induction Heater

In one embodiment, both the well-casing and the coil or multiple coils are rotated at specified frequencies to optimize the inductive heating effect. In one embodiment, the well-casing and the field coil are rotated in opposite directions at specified frequencies so that the relative velocity of the well-casing to the field coil is increased, which enhances the inductive heating effect while maintaining lower individual rotational velocities of either the well-casing or the field coil.

Motor for Rotating or Vibrating Well-Casing and/or Field Coil for the Induction Heater The motor that is used to rotate or vibrate the heat source can be located either above ground or can be located below ground in the well-bore. If the motor is located below ground within the well-bore, it is preferred that the power cable supply power to both the heat source and the motor in order to reduce complexity of the down-hole heating device.

In one embodiment, the well-casing and/or DC coil is mechanically rotated or vibrated using a pneumatic or hydraulic motor. In this embodiment, it is also possible to utilize the cryogenic cooling fluid used to cool the superconducting power transmission cable and/or coil, for the pneumatic or hydraulic fluid to drive this type of motor.

In another embodiment, the well-casing and/or DC coil is mechanically rotated or vibrated using an electric motor. The electric or pneumatic motor can be located either above ground and driven with links and gears or it can be compact and located below ground.

In another embodiment, the mechanism that is used to initially drill the well-bore shaft is subsequently used to provide the mechanical rotation for the well-casing and/or DC coil. In this embodiment, the drill and the well-casing should be connected with a custom built mechanical coupler.

Bearing/Slip-Ring for the Induction Heater

In the down-hole induction heating device electrically powered by DC current in which either the well-casing or the field coil is rotated, and/or both, a bearing/slip-ring is helpful to translate the electrical power from the cables and other ancillary items such as tubing from rotating reference frame to the fixed or stationary reference frame. Other common names for this electro-mechanical device include: slip rings, rotary electrical interfaces, rotating electrical connectors, collectors, swivels, electrical rotary joints, or commutators. Common types of bearings or slip-rings include: brushes, mercury wetted brushes, pancake slip-rings, or ferro-fluids such as those in U.S. Pat. No. 4,604,229 by Borduz et al, which is incorporated in its entirety for the purposes of enablement.

Electrically Conducting Magnetic Permeable Well-Casing for the Induction Heater

In the down-hole heating device, it is important to design the device so that the well-casing and the cryostat are two separate items within the embodiment. The cryostat wall should be electromagnetic transparent and not absorb electromagnetic radiation from the heat source. On the contrary, the well-casing should be design to be inductively coupled to the heat source and absorb the electromagnetic radiation (i.e. alternating magnetic field) from the heat source (i.e. coil). It is preferred that the physical wall thickness of the well-casing be within 1-3 times the electromagnetic skin-depth of the well-casing, where the electromagnetic skin-depth is given in Eq. [1] below. The more energy that is absorbed on the well-casing relative to the amount emitted by the heat source, the higher the efficiency of the down-hole heating device.

In one embodiment, the well-casing is comprised of material that is both electrically conducting and magnetically permeable as Fe, Co, Ni, steel, or alloys thereof. In another embodiment, the well-casing is made of electrically conducting material but not magnetic permeable material. The advantage of having a well-casing comprised of magnetic permeable material is that the distance for the electro-magnetic skin depth is reduced, where the electro-magnetic "skin depth" is given by the equation:

$$\delta \cong \sqrt{\frac{2}{\omega \sigma \mu}} \quad [1]$$

where $\delta$ is the skin depth in meters, w is the angular excitation frequency in Hz of the casing, $\sigma$ is the electrical conductivity in Siemens, and $\mu$ is the magnetic permeability of the material. At typical AC power frequencies of 50-60 Hz, the skin depth in copper is $\delta \sim 8.8$ mm, while at higher frequencies ~400 Hz, the skin depth is reduced to $\delta \sim 3$ mm. This skin depth can be reduced if the material selected is both electrically conductive and magnetic permeable e.g. Fe, steel, mu-metal, etc. For example, for steel casing with a magnetic permeability $\mu \sim 1000$, the skin depth $\delta$ is reduced to ~0.7 mm. The type of magnetic permeable material, the thickness of the well-casing, and the rotational velocity must be optimized to maximize structural integrity and heating.

In another embodiment, the well-casing is made from magnetic permeable steel that is comprised from low carbon steel. Low carbon steel can be advantageous for the superconducting down-hole heating system because low carbon steels tend to be less brittle than higher content carbon steels at lower temperatures. Brittle facture of steels at low temperature may be an issue in the event that the cryogenic cooling fluid accidentally leaks or spills from the cryostat container and onto the outer well-casing.

Well-Casing for the Induction Heater

The well-casing serves many useful functions for the superconducting down-hole heating system. An advantage of using the well-casing as the heat source (i.e. inductively heating the well-casing) over that of a traditional resistive heat source is that the well-casing is in direct thermal contact with the contents within the reservoir. Thus, the heat generated at the wall of the well-casing is transferred directly to the product thereby increasing thermal efficiency and reducing the peak temperature required at the heat source. Lowering the peak temperature experience by the heat source reduces the potential for scale build-up on the resistive heat source and reduces the potential for burn-out. Burn-out of the heat source can be quite costly as the heating tool must be extracted, repaired, and replaced thereby negatively impacting production capacity at the well site.

For the superconducting down-hole induction heating system, the well-casing acts as the heat source in which the time varying magnetic field electrically induces eddy currents on the wall of the well casing. These eddy currents generate the heat on the well-casing which causes the heavy oil (e.g. bitumen) lowering its viscosity and thus causing it to flow and the extraction of the oil. As stated above, the well-casing can be electrically conducting and/or both electrically conducting and magnetic permeable. In addition, the well-casing must extend over a considerable length varying from as short as tens of meters to several hundreds of meters to kilometers. For example, is some oil extraction operations the horizontal length of the well-casing may extend several hundreds of meters to kilometers in length. When the well-casing needs to extend of long distances it is often convenient to fabricate the well-casing is discrete lengths and transport them to the drilling site. At the drilling site, the discrete well-casings are then coupled together to make a single longer piece length. Often a convenient discrete unit length for the well-casing is the maximum length that can be transported by rail or over land via a tractor trailer, which is typically at 10-m in length.

Another very important feature of the well-casing is that it must allow for the extraction of the heat oil. There are many different approaches for this requirement but a common approach is to slot the well-casing in multiple locations or alternatively to provide some type of perforations along the well-casing. By slotting the well-casing in multiple locations, this simultaneously allows for both the eddy currents to develop on the well-casing thereby heating the surrounding heavy oil and for the oil to flow into the multiple slots along the well-casing. Once the oil is heated and its viscosity lowered, the oil is then free to flow into the slotted portions of the well-casing, build up enough pressure and eventually be extracted from the well-bore. The size, number, and placement/locations of the slots along the well casing need to be optimize to deal with the competing effects of maximizing heat deposition to the well-casing in conjunction with maximum oil and gas extraction. It is important to note that the width of the slot must not be so large as to let excessive amounts of sand and other unwanted particles into the fluid and gas extraction streams yet not small enough to cause excessive clogging of the slots or too small of volume of fluid and gas extraction to be economically viable.

In one embodiment, the well-casing has a circular shaped cross section although other cross sectional shapes are possible, e.g. hexagonal, rectangular, square, elliptical, etc. In this embodiment, the well casing is electrically conducting and/or magnetically permeable.

In one embodiment, the well-casing is comprised a multiple discrete lengths that are coupled together to form a longer continuous length. In this embodiment, the discrete unit lengths are chosen to be appropriate for transport on rail or across land. Typical unit lengths are approximately 10-m in length, although other unit lengths are possible.

In one embodiment, the well-casing includes multiple slots of sufficient number, depth, and width, to allow for oil and gas extraction while minimizing the inclusion of sand and other unwanted particles. In another embodiment, the fluid extraction through the well-casing is made via holes with screens or mesh placed over the holes. The size, shape, number, and location/distribution of holes is optimize to accommodate the competing effects of maximum heat deposition in conjunction with maximum oil and gas extraction.

Cryogenic Cooling Fluid

In this disclosure, the term cryogenic "fluid" used to described a particular cryogenic coolant can apply to many aspects of a materials phase diagram including single phase liquids, single phase gas, two-phase gas-liquid mixtures, single phase supercritical fluids, single phase solids, two-phase solid-liquid mixtures, etc. see for example, J. Wilks, *The Properties of Liquid and Solid Helium*. Oxford: Clarendon Press (1967) *ISBN* 0-19-851245-7, which is incorporated by reference in its entirety for enablement.

In one embodiment, both the superconducting power transmission cable and the AC or DC excitation coil or coils are comprised of high temperature superconducting conductors or conductors such as first generation Bi—Sr—Ca—Cu—O or second generation Re—Ba—Cu—O coated conductors. The superconducting coil and cables are then cooled with a single cryogen consisting of either a single or two phase fluid of liquid nitrogen, although other liquid cryogens are also possible such as liquid air, liquid neon, liquid argon, liquid hydrogen, and liquid helium. Single phase cryogenic liquids can be advantageous in applications where high voltage is present because cryogenic liquids such as liquid helium, liquid, nitrogen, liquid hydrogen, liquid neon, etc.) will have in general higher dielectric breakdown strengths than their gaseous phase counter-part. In practice it can be difficult to obtain and maintain a cryogenic liquid in a single phase. Often gaseous phase is also present, thereby weakening the dielectric strength of the two-phase fluid and making it more susceptible to breakdown at higher voltages. A disadvantage of a single phase cryogenic liquid is the increased "head" pressure cause by the excessively long length of the down-hole heating device. The so-called "head" pressure developed by the column of cryogenic liquid is given by: $P_{head\_pressure} = \rho\ g\ h$, where $\rho$ is the average material density of the cryogenic fluid, g is the acceleration due to gravity, and h is the height of the vertical column. Thus, for well-bores buried far below ground (~1-2 km), the height of the vertical column can be quite large, which creates a very large head pressures of the cryogenic liquid. This large pressure can be particularly difficult to pump with standard cryogenic circulation pumps and must be contained by the thin walls of the cryostat vessel. Liquid hydrogen as the cooling fluid has many advantages in downhole heating applications. The advantages of using liquid hydrogen (gaseous, supercritical, among other phases) as the cryogenic cooling fluid include but are not limited to: a) extremely low material density (~70.9 gm/L) which lowers the head pressure in vertical portions of the well, b) low cost relative to other cryogenic fluids such as helium, neon, etc., c) high heat capacity (~445 J/gm) relative to other cooling fluids such as helium (~20 J/gm), nitrogen (~199 J/gm), neon (~85 J/gm), d) low boiling point of ~20K at STP, which enhances the performance of both the superconductor and the non-superconducting resistive normal metals, and e) among other benefits. Liquid hydrogen could be a particularly good choice for cooling both the superconducting power transmission cable and heat source (i.e. superconducting coil or non-superconducting coil), where excessive head pressure of the cryogenic fluid is problematic. Liquid hydrogen could also be a an excellent cryogenic coolant for the non-superconducting power transmission cable described in this disclosure such as copper or aluminum because its large reduction in electrical resistance at these temperatures. For example, in high purity aluminum ~99.99 to 99.999% purity, the drop in electrical resistance from its room temperature value could be >1000 or higher. This corresponds to >1000 reduction in electrical heating losses and hence significantly higher power densities. Since the ideal Carnot efficiency at 20 K is 14 W of room temperature refrigeration for every 1 W of refrigeration capacity at 20 K, and actual real Carnot efficiencies in large capacity machines is ~25% Carnot, this would result in a Carnot penalty of ~56 W of room temperature power for every 1 W of coolant at 20 K. Thus, a factor of >1000 reduction in ohmic losses by operating a high purity aluminum power transmission cable at 20 K in liquid hydrogen would more than adequately compensate for the thermodynamic penalty by having to cryogenically cool the cable.

In another embodiment, the AC or DC excitation coil or coils are non-superconducting but cooled with a cryogenic cooling fluid.

In another embodiment, cold gas or supercritical cryogenic fluids can also be pumped through the cable and coil to cool these components well below their superconducting transition temperature. The advantage of forced flow cooling a supercritical fluid such as nitrogen, hydrogen, neon, or helium is that all of the fluid is in a single phase. Single phase cryogenic fluids can be advantageous in forced flowed cryogenic cooling circuits since its properties are uniform and consistent, whereas two phase mixtures of liquids and gases have properties that depend upon the relative portions of the liquid and gas phase which can change depending conditions within the cooling circuit. Another advantage of using a supercritical fluid or a single phase gas is reduced pressure caused by the head height of the fluid. This reduced "head" pressure facilitates the pumping of the cryogenic fluid. The reduced head pressure is due to the significantly lower density of the cold gas or supercritical cryogenic fluid compared to the single-phase cryogenic liquid.

Pressurized and Sub-Cooled Cryogenic Cooling Fluids

In one embodiment, the superconducting cable and the superconducting or non-superconducting resistive coil are cooled with a cryogenic fluid that has been pressurized and sub-cooled. A pressurized and sub-cooled cryogenic fluid such as liquid nitrogen has many advantages in terms of increased current and voltage ratings of the system that uses it including: a) increases in critical current density (i.e. current carrying capacity per unit area) of the superconducting material as the temperature is lowered, b) a larger operating temperature window between the sub-cooled liquid temperature and the gaseous phase in the event of an interrupt or fault condition, and c) a high dielectric breakdown strength of the single phase liquid fluid due to the elimination of the lower dielectric strength gaseous bubbles. Sub-cooled and pressurized liquid nitrogen, liquid air, liquid oxygen, liquid helium, liquid, hydrogen, liquid neon, mixtures thereof, among other types of cryogenic cooling fluids are all common choices for cryogenically cooling superconducting cables and heat sources.

Hermetic Vacuum Power Feed

In one embodiment, the cold cryogenic superconducting cable and the cryogenically cooled superconducting or non-superconducting resistive coil are fed with either AC or DC electrical power from an ambient room temperature power source located above ground. In order to feed the power from the ambient temperature power source to the cryogenically cooled superconducting cable and coil, a low heat leak, typically a vacuum hermetic current down lead is required to span the temperature range. This current down lead device goes by many names including: voltage bushing, electrical feed-through, termination, etc. In one embodiment, this current down lead or feed-through is located on the end of the power cable that is above ground, although it is also possible to perform this task on the opposite end of the power cable located below ground. The electrical power feed-through located below ground is less convenient than if located above ground due to size, space, and accessibility constraints. The voltage isolation or stand off and the current rating of the power feed through or bushing must be optimized for any given superconducting power cable and coil.

In another embodiment, the heating system is a hybrid system with a superconducting power transmission cable and a warm ambient temperature resistive non-superconducting heat source. The ambient temperature heat source can either be a non-superconducting coil for the induction heater, a non-superconducting antenna for the radiative heater, or a resistive heating element for the resistive heater. In certain of these hybrid systems, two low heat hermetic power feed-throughs are preferred. The first power feed-through is located above ground and its purpose is to transition from the room temperature electrical power source to the superconducting power transmission cable. The second power feed-through is located below ground and it is used to transition the electrical power from the superconducting cable to the non-superconducting heat source. The power feed-through located below ground should be compact enough to fit within the well-bore.

Epoxy Impregnated Coils

In one embodiment, the coils are impregnated with epoxy resin and subsequently cured so that the coils have high dielectric insulation strength, are strong and rugged, and help conduct heat. In one embodiment, the coils are vacuum pressure impregnated, although other types of curing techniques are possible such as "wet winding" with epoxy or using a thermoset "pre-preg" with a subsequent curing. The type of epoxy used in the coils depends upon the particular application. For superconducting coils or cryogenically cooled resistive coils, a cryogenically compatible epoxy is desired. Using a cryogenically compatible epoxy reduces the amount of cracking in the epoxy caused by the large number of repeated thermal cycles There are many types of cryogenically compatible epoxies such as those sold under the trademarks Stycast, Masterbond, Epon, Huntsman, Vantico, etc. If the coils are operated in a warm ambient environment, then an epoxy rated for high temperature operation such as Ripley's resin 468-2 is preferred because these types of epoxies are far cheaper and better suited for higher temperature operation.

Conduction Cooling or Bath Cooling

In one embodiment, the superconducting cable and/or the heat source (e.g. superconducting coil or non-superconducting resistive coil) are externally cooled by thermal conduction. In another embodiment, the superconducting cables and/or the heat source (e.g. superconducting coil or non-superconducting resistive coil) are externally cooled by immersion into a cryogenic fluid such as liquid helium, liquid nitrogen, liquid hydrogen, liquid air, liquid oxygen, liquid neon, liquid argon, liquid natural gas, mixtures thereof, or other liquid cryogenic fluids.

In another embodiment, the superconducting cable and/or heat source (e.g. superconducting coil or non-superconducting resistive coil) are cooled by a solid cryogen such as solid nitrogen, oxygen, hydrogen, air, neon, mixtures thereof, or other solid cryogens.

Internal Cooling or Forced flow Cooling

In one embodiment, the superconducting power transmission cable is internally cooled with forced flowed supercritical fluid such as He, O2, N2, Ne, air, H2, etc. In this embodiment, the supply path coolant/refrigerant is in a separate vacuum vessel than the return path of the coolant/refrigerant.

In another embodiment, both a supply and return path of the cryogenic coolant are included within the same conduit or sheath. This is sometimes referred to as counter-flow fluid exchange. It may be desirable to insert some thermal insulation between the supply and return coolant paths to better thermally isolate the superconducting conductors from the warmer return coolant path.

By including a return path of the cryogenic coolant, this can provide for a more compact design, reduces required space, and avoids the complexity of locating a separate return line for coolant flow. This type of counter-flow cooling has been described in the related art work U.S. Pat. No. 7,453,041 by Maguire et al, which is incorporated by reference in its entirety for the purpose of enablement. Superconducting cable designs with multiple coolant flow has been described in the related art work U.S. Pat. No. 8,280,467 by Maguire et al, which is incorporated by reference in its entirety for the purpose of enablement.

Electrical Splicing

In one embodiment, the conductor comprising the superconducting cable and the superconducting coil contains no electrical connections or splice joints and is comprised of a single continuous piece length.

In another embodiment, the conductor comprising the superconducting cable and/or superconducting coil does contain electrical connections or splice joints. Common types of electrical connections or splice joint configurations include: butt joints, lap joints, bridge joints, interleaved joints, and praying hands joints, etc. Common types of electrical joining techniques include solder, cold welds, pressed contacts, etc. In certain embodiments, a combination of splice joint configurations and electrical joining techniques may be used. In one embodiment, if the heat source is a superconducting coil it is preferred that the electrical splices are made in the lower magnetic field regions of the superconducting coil such as in the outer most turns, although the splice joints can be made in the higher magnetic field regions.

In one embodiment, a splice joint is made by interleaving superconducting conductors. By interleaving the superconducting tapes within a single stack this transposes the position of the superconducting tape within the stack. This transposition reduces magnetic flux coupling losses. It is preferred that these interleaved splice joints are made in a region of low magnetic field such as the outer radius.

Resistive Heating Device

In one embodiment the heat source is a resistive heater comprising at least one or more resistive heating elements. There are three common ways in which to electrically power the heating element or multiple heating elements: a) single-phase AC power, b) three-phase AC power, and c) DC power. Three-phase AC power is preferred over single-phase AC power so as not to cause a load imbalance from the power source. AC power is generally preferred over DC as a matter of convenience and availability of the power source and thereby eliminating the need for an AC to DC converter.

In one embodiment, a superconducting three-phase cable transmits power to a resistive heating element. In one embodiment, the superconducting cable geometry is a tri-axial cable arrangement in which the three separate phases and a grounded shield are separated by an electrically insulating layer between the phases and each of the phases are spirally wrapped around a central corrugated flexible channel. In one embodiment, the cryogenic cooling supply path fluid is passed down the central corrugated flexible channel and the return path flow is passed over the outermost superconducting layer in a counter-flow arrangement. The flexible, thermally insulating vacuum jacketed cryostat of this embodiment forms the outermost wall containing the cold cryogenic fluid. The resistive heater requires two sets of low heat leak, hermetic, power feed through on both ends of the superconducting cable. One ambient to cryogenic hermetic power feed-through is located above ground and the other is located below ground within the well-bore. The compact ambient to cryogenic hermetic power feed-through located below ground electrically connects the cryogenically cold superconducting power transmission cable to the hot heating element that heats the surrounding fluid and gas for extraction.

In one embodiment, the heat source is encased in a high temperature electrically insulating material like magnesium or zinc oxide, although other high temperature insulating materials are possible.

In another embodiment for the resistive heater, the superconducting power cable is powered with a single-phase AC power source. When the superconducting cable is powered with a single phase AC current, a possible cabling geometry is the co-axial arrangement, although a bi-polar geometry is also possible.

In yet another embodiment for the resistive heater, the superconducting power cable is powered with a DC power source. When the superconducting cable is powered with DC current, one possible cabling geometry is the co-axial arrangement although a bi-polar geometry is also possible.

Resistive Heating Element

In one embodiment, the resistive heating element or multiple heating elements is a metallic filament wound coil with Nichrome™ (80% Ni 20% Cr) conductor, although other heating element configurations are possible including: conductor, strip, foil, thick film, ribbon, conductor, or other configurations. In another embodiment, the metallic conductor is fabricated with Cu, Sn plated Cu, Al, anodized Al, Pt, Fe, Ni, Cr, W, superalloys sold under the trademark Incoloy, alloys sold under the trademark Hastelloy, cupronickle (CuNi), iron-chromium-aluminum alloys sold under the trademark Kanthal (FeCrAl), alloys thereof, or other resistive metallic materials.

In another embodiment, the resistive heating element or multiple heating elements is fabricated with a ceramic or composite material including: silicon-carbide (SiC), Molybdenum, molybdenum silicide ($MoSi_2$), lead-titanate ($PbTiO_3$), barium titanate ($BaTiO_3$), or other ceramic materials.

In another embodiment, the resistive heating element or multiple elements is a thick film fabricated with Pt, SiC, $MoSi_2$, or other thick film resistive coatings.

Resistive Heating Element Insulation

In one embodiment, the resistive heating element or multiple heating elements is surrounded by an electrically insulating fused magnesium-oxide (MgO), although any electrically insulating material capable of withstanding the very high temperatures and voltages with cracking, flaking, or otherwise mechanically, thermally, or electrically degrading is possible.

In another embodiment, the resistive heating element or multiple elements insulating material is a fluoro-polymer surrounded by a braid and a galvanized protective armor jacket.

Mechanical Structure of the Heat Source

There are many competing factors in designing and fabricating the mechanical structure used to support the heat source (e.g. antenna, coil, or resistive heating element). The mechanical structure for the heat source and its accompanying equipment, piping, and plumbing, must be strong and rugged enough so that the down-hole heating device can be repeatedly pushed and pulled as it moves through the well-bore. Yet, the support structure must be light and flexible enough that it can be worked past the curves, contours, and deviations within the well-bore. The mechanical support structure should be flexible enough to achieve a minimum bending radius of about 20 degrees per 30 m. When powering the heat source with AC current, it is also better if the support structure were electrically insulating so as not to induce eddy currents in the support structure itself which reduces efficiency of the down-hole heating device. The mechanical structure should provide good tensional and compression along the longitudinal axis. There are many types of mechanical structure that are possible for down-hole heating devices.

In one embodiment, the mechanical support structure is a single rod or multiple rods extending along the longitudinal axis of the heat source. The axial tensioning rods can be made of high strength composite materials such as fiber reinforced plastics sold under the trademark G-010 or G-11, thermoplastics, sold under the trade name Ultem, stainless steel, aluminum alloys, titanium alloys, or other high strength, non-magnetic materials. For the down-hole heater with a cryogenically cold heat source the mechanical structure must also be cryogenically compatible. High carbon steels or steels with high sulfur content can become brittle at low temperatures and hence are not suitable for the down-hole heater that is configured to operate cryogenically cold. A plate/cap/flange is located at the top and bottom of the heat source and the rods running along the longitudinal axis of the heat source are attached to the top and bottom plates.

There are several methods to attach the axial rods to the top and bottom flanges including: welding, soldering, threaded components, nuts, and fasteners. A common method is to thread axial rods on both ends and tighten with a nut to the desired compression. To keep the plates/caps/flanges under constant compression, it is preferred to use either split washers or cupped shaped washers known as Bellville washers. Cupped shaped washers apply a constant compressive force when loaded. The number of cupped shaped washers can be adjusted depending upon the desired constant load and distance over which the constant load needs to be applied. The use of cupped washers is particularly advantageous for the heat source that is cryogenically cooled since it is common for most materials to shrink dramatically when cryogenically cooled. If the thermal shrinkage is not accounted for properly, the top and bottom plates cap become disengaged from the heat source and no longer provide mechanical support. For example, if the heat source were a superconducting coil or a non-superconducting resistive coil that was cryogenically cooled, it is advantageous to use cupped shaped washers when tightening the nuts on the top and bottom flanges in order to maintain the axial compression of the top and bottom flanges against the coil as it shrinks along is longitudinal axis.

In another embodiment, the mechanical support structure is a skeleton type or ladder type frame extending along the longitudinal axis of the heat source. The advantage of a skeleton-ladder type frame is that it provides both axial tension and compression along the short and long axis of the skeleton-ladder frame. The skeleton-ladder frame can extend along the longitudinal axis of the heat source and attached to the top and bottom end flanges. The advantage of the skeleton-ladder frame over the simple axial tie rods is that it provides mechanical support in two directions as opposed to the single linear direction of the axial tie rod. The disadvantage of the skeleton-ladder frame is that it is heavier, more complex, and costly to fabricate.

Resistively Heating the Oil

Another type of resistive heating device involves using the electrically conductive properties of the oil itself. In this embodiment, electrical power is transmitted down the well bore using a positive cathode and negative anode. The potential difference ($\Delta V$) between the positive cathode and negative anode creates a current flowing in the medium contained between the two anodes. The magnitude of the current flowing $I=\Delta V/R_{medium}$, where $R_{medium}$ is the effective electrical resistance of the medium between the two anodes. The higher the potential difference and the lower the resistance of the medium, the higher the current flow through the medium. The medium itself begins to heat due to Joule heating. Once the medium begins to heat and hence lower its viscosity and the pressure begins to build, the fluid can be extracted via perforations in the well casing and flow back towards the recovery equipment. The cathode/anode can be powered with single-phase AC, three-phase AC, or DC electrical power. The two anodes extending the length of the well-bore can be comprised of either a superconducting cable or a cryogenically cooled non-superconducting resistive cable.

Sensors for Down-Hole Heating

In the embodiments described within this disclosure, the superconducting down-hole heating systems are typically fitted with multiple sensors of various types that are used to monitor both the in-situ health of the heating system as well as the commodity production rate. Typical types of sensors include but are not limited to temperature, pressure, mass flow, among other types. The real time data gathered from these sensors can be used for remote operation or subsequent analysis to improve future production.

Ancillary Equipment for Down-Hole Heating

In any down-hole heating device there is ancillary equipment needed to support the installation, positioning, and operation of the down-hole heating device as well as the extracted fluid recovery and storage. The down-hole heating device needs an electrical power source for installation, positioning, and operation. For an AC heat source, the input electrical power may require a transformer to either step-up or step-down the voltage powering the heat source. For the DC heat source, a DC power supply or AC-DC rectifier may be required to power the heat source. The down-hole heating device will require a pump or several pumps to remove the extracted fluid and gas. In one embodiment the pump is located above ground although in another embodiment the pump is located below grown within the well-bore. If the pump is located below ground, it is preferred that the pump and the heat source are coupled together and powered with the same power transmission cable as this reduces complexity of the down-hole heating device. A drain port or multiple drain ports introduces the extracted fluids and gases into down-hole heating device where the pump(s) are used to extract the fluids and gases. Sometimes it is preferred that this operation be performed under vacuum conditions so as to minimize the presence of gas bubbles in the fluids.

In one embodiment, the down-hole heating device will need attendant tubing, hoses, and/or piping connected to the pump to convey the fluids, gases, and related commodities produced from the reservoir. The down-hole heating device will require attendant equipment that positions and locates the heat source within the well-bore along a production interval.

In another embodiment, the power transmission cable with sufficient tensile strength could be used to support and position the down-hole heating device along the production interval.

In-Situ Steam Generation

A significant advantage of the embodiments described in this disclosure is the superior power density provided by either the superconducting power transmission cable or the cryogenically cooled non-superconducting power transmission cable over prior art. For the inductive down-hole heater, this can be combined with one or more superconducting coils, one or more cryogenically cooled non-superconducting coils, or combinations of both superconducting and non-superconducting coils. A second major advantage of the embodiments described in this disclosure over prior art is that the heat source can be comprised of either a superconducting and/or cryogenically cooled non-superconducting coil or coils which are capable of generating significantly higher magnetic flux density than compared to non-superconducting coil operating at warm ambient temperatures described in the prior art. The superior power density per unit volume of the superconducting or cryogenically cooled non-superconducting transmission cable combined with the higher magnetic flux density of the cryogenically cooled superconducting or non-superconducting coils, enables the embodiments described in this disclosure the ability to generate MW per meter of power over extremely long distances. This high power density enables the production of high quality (i.e. 100% quality steam or 100% saturated steam) "in-situ" down hole, within the narrow confines of the well-bore. The higher power density down-hole heating system described in this disclosure is advantageous over existing art, which typically requires high quality saturated steam to be injected above ground at the well-head. The quality of the steam can be significantly reduced due to the loss of the latent heat as the steam travels down-hole to the heated production area. Typical losses of latent heat in saturated steam range from 15% to as high as 40%. These losses can be quite substantial and quickly add up in both unwanted costs and excessive water usage and greenhouse emissions. While many factors can vary depending upon the production site, the number of barrels of steam required to produce a single barrel of hydrocarbon can vary between as low as three barrels to as high as 10 barrels of steam per barrel of hydrocarbon production. The ability of the embodiments described in this disclosure to generate 100% high quality steam down-hole in-situ is highly desirable. The embodiments described in this disclosure, allow for the well-head to be located farther from the heat source located down-hole, thereby extending the effective length of the production area. Extending the effective heated zone (typically in the horizontal production zone area) can greatly enhance the heavy oil/hydrocarbon extraction and increase production rates which increase production rates per given well-head. Furthermore, since 100% quality steam can now be produced down-hole, directly at the production zone, this can shrink the physical size and heat generation capacity of the steam plant located at the well-head and also the associated amount of water usage typically associated with SAG-D or TAG-D operations, thereby reducing the initial capital costs of the above ground steam plant as well as the long term operating costs by reducing the amount of water used during these operations. In summary, by using the embodiments described in this disclosure to generate steam in-situ within the well-bore many benefits can be realized including but not limited to: enhanced hydrocarbon production, lower capital costs by reducing the size of the steam plant located above ground, lower long term operating costs by reducing net water usage and its corresponding clean up and reclamation, provide higher energy efficiency operation by reducing loss of latent heat of steam as it is transmitted down the well, among other benefits.

In one embodiment, the down-hole heating system described in this disclosure is used to generate high quality saturated steam within the production well that carries the hydrocarbons to the surface.

In another embodiment, the down-hole heating system described in this disclosure is included in the adjacent steam well to help convert the low quality steam arriving from above ground that has lost a portion of its latent, back to high quality 100% saturated steam.

In yet another embodiment, the down-hole heating system described in this disclosure is included in the both adjacent steam well and the hydrocarbon production well for the generation and maintenance of high quality saturated steam in-situ, below ground, and within the narrow confines of the well-bore.

Plasma-Blasting Using Superconducting Power Transmission Cables

Multistage fracture drilling involves creating horizontal fractures or cracks in the ground at multiple levels. The fracture drilling results in a number of cracks stacked on top of each other vertically throughout the oil or gas well. Oil and gas and other related commodities may then be extracted through these cracks. Plasma Blasting Technology (PBT) involves the production of a pulsed electrical discharge by inserting a blasting probe in a cavity drilled in a rock, which produces shocks or pressure waves. These pulses then propagate into the rock, leading to fracture It can be useful to fill these cavity with a fluid such as water to help aid in the propagation of these pressure waves. Using plasma-blasting technology involves creating an electric pulse that stimulates the rock surrounding an oil well, thereby causing fragmentation of the rock. Uneven blasting in this highly pressurized environment ensures that these fractures will be kept open, so that extraction can proceed. Unlike hydraulic blasting, plasma blasting is more economical because it eliminates large expenditures on specialized fluids, supply trucks and operators. Plasma-blasting technology also provides an environmentally friendly alternative to hydraulic blasting In one embodiment, a superconducting cable is used to transmit electrical power continuously to a plasma-blasting device. In another embodiment, pulsed electrical power may also be transmitted by the superconducting power cable to the plasma probed instead of continuous power. An advantage of using a superconducting cable to transmit the electrical power over a non-superconducting resistive cable is that the superconducting cable can transmit equivalent power at lower voltages but at higher current levels. The lower voltage, higher current superconducting cable is safer to operate, has less stringent electrical insulation requirements, and uses a smaller more compact power supply.

In another embodiment, a cryogenically cooled non-superconducting resistive cable is used to transmit electrical power continuously to a plasma-blasting device. In another embodiment, pulsed electrical power may also be transmitted by the non-superconducting resistive cable to the plasma probed instead of continuous power. An advantage of using a cryogenically cooled non-superconducting resistive cable to transmit the electrical power over a non-superconducting resistive cable operating at ambient temperature is that the cryogenically cooled non-superconducting resistive cable can transmit equivalent power at lower voltages but at higher current levels. An advantage of a cryogenically cooled non-superconducting resistive cable over a superconducting cable to transmit power to a plasma blasting device is the lower cost of the non-superconducting resistive cable.

Various modifications to the down-hole heating tool, the down-hole heating methods, and plasma blasting technology described herein should become transparent from the above description of the various embodiments. Although the down-hole heating device and the superconducting cable for the plasma blasting device has been described in detailed from the embodiments, it should be understood that this explanation is for clarity and illustration and the invention is not limited to these embodiments. Various types of down-hole heating devices and operation techniques will thus be apparent to those skilled in the art in view of this disclosure. Modifications are thus contemplated and may be made without departing from the spirit of the invention, which is defined by the claims.

BRIEF DESCRIPTION OF FIGURES

FIG. 1: A side-view of the down-hole heating device is shown in FIG. 1. The well-head (10) is the portion of the down-hole heating device above ground. The down-hole heating device is inserted into the vertical portion of the pre-drilled well (20) to a specified depth. The well-bore (30) specifies the maximum width of the drilled well (20). Electrical power is transmitted along the power transmission cable (40) to the heat source (50) which is located below ground within the narrow confines of the well-bore (30). Upon application of electrical power from to the heat source (50), the surrounding hydrocarbons heat up and hence lower their viscosity and begin to flow (60).

FIG. 2a: A side-view of a three-phase tri-axial cable (70) is shown in FIG. 2a. The cryogenic cooling fluid (80) flows down the central former (90) of the tri-axial cable (70). The central former (90) can either be flexible or rigid depending upon the application and requirements. Dielectric electrical insulation (100) separates the components at phase potential and the other components not at phase potential, which are typically grounded or floating. The cryogenic cooling return flow (110) is along the annulus of the tri-axial cable. It is possible to reverse the direction of the cryogenic cooling flow so that the cooling fluid inlet is within the tri-axial cable's annulus and the return flow is along the central former (90). The three phase conductors, from the innermost Phase A (120), Phase B (130), to the outermost Phase C (140), are concentrically wound around the central former (90) and separated by a dielectric insulation (100) which is rated to a specified voltage level. Because each of the three phase conductors are wound on different diameters, it is important to try to match to the extent possible the current carrying capacity of each of the three phases (120, 130, and 140). This is typically accomplished by varying both the number of conductors contained within each phase and the quality (i.e. current carrying capacity) of the conductors within each phase. A conductive shield surrounds the outermost phase C (140) and is used to carry any remaining unbalanced currents to/from the load. In well balanced systems, the current flowing in the conductive shield (150) is typically much less than the phase conductors (120, 130, and 140). The tri-axial cable (70) is housed within a thermal enclosure known as a cryostat (160) that both protects the tri-axial cable (70) and reduces the parasitic heat load to the cryogenic cooling fluid (80) and (110). The cryostat (160) can be fabricated from flexible corrugated pipe or thin wall piper that can bend over the desired radius of curvature.

FIG. 2b: A side-view of a co-axial power transmission cable (170) is shown in FIG. 2b. The cryogenic cooling fluid (80) flows down the central former (90) of the co-axial cable (170). The central former (90) can either be flexible or rigid depending upon the application and requirements. Dielectric electrical insulation (100) separates the components at phase potential and the other components not at phase potential, which are typically grounded or floating. The cryogenic cooling return flow (110) is along the annulus of the co-axial cable (170). It is possible to reverse the direction of the cryogenic cooling flow so that the cooling fluid inlet is within the co-axial cable's annulus and the return flow is along the central former (90). The two phase conductors are comprised of the innermost positive conductor (180) that is concentrically wound around the former (90) and the outermost negative conductor (190), sometimes referred to as the shield conductor (190). The positive conductor (180) and the negative conductor, or shield, (190) is separated by a dielectric insulation (100), which is rated to a specified voltage level. The polarity on the co-axial cable, however, can be reversed, with the negative conductor, or shield, (190) being the innermost phase and the positive conductor (180) being the outermost phase, if desired. Because the two conductors are wound on different diameters, it is important to try to match to the extent possible the current carrying capacity of both phases (i.e. polarities). This is typically accomplished by varying either the number of conductors contained within each phase or the quality (i.e. current carrying capacity) of the tapes comprising each phase, or a combination of both. The co-axial cable (170) is housed within a thermal enclosure known as a cryostat (160) that both protects the co-axial cable (170) and reduces the parasitic heat load to the cryogenic cooling fluid (80) and (110).

FIG. 4: A side-view of a 3 phase, alternating current, inductive heat source (230) is shown in FIG. 4. An insulating support structure (240) comprises the center of the inductive heat source (230). Surrounding the exterior of the support structure are three phase coils: phase A coil (260), phase B coil (270), and phase C coil (280); all of which can be wound around a coil bobbin (250) If needed, the coil bobbin (250) can be made of a magnetic permeable material to enhance the magnetic field, which thereby reduces the number of required ampere turns. All three phase coils (260, 270, and 280) can be potted with a cryogenically compatible epoxy to increase the stiffness and strength of the coil as well as enhance heat transfer, and provide additional dielectric strength. The three phase heat source (50) is powered by the power transmission cable (40), and it inductively couples the electromagnetic energy from the power transmission cable (40) to the well casing (420). A plurality of coils (670) can be electrically connected to extend the axial length of the heat source (50). For example, see FIGS. 14a and 14b which show an extended axial length version. An electrical bus (not) shown connects the three phase coils (260, 270, and 280) to the three phase power transmission cable (70). The three phase coils can be operated cryogenically cold and contained within the cryostat (160) that contains the power transmission cable (50) or it can be operated at warm-to-hot ambient temperatures. Although not shown, a two coil arrangement can be used for when the power source (590) is either a single phase AC source of a DC source. For the two coil arrangement (not shown), it is convenient to space the coils approximately 180° apart for both electromagnetic and mechanical balancing. The two coil arrangement spaced 180° apart is particularly beneficial if a DC power source is used and either the two coils, well-casing (420), and/or both are rotated to create and alternating magnetic field. Other multiple coil arrangements (single coil, two coils, three coils, four coils, etc.) are possible if desired.

FIG. 5: A 2-d cross-sectional view of a down-hole heating device is shown in FIG. 5. Electrical power is transmitted down the power transmission cable (40) to the heat source (50). In FIG. 5 the heat source (50) is a coil (260) inductively coupled to the well-casing (420). The single coil (260) is radially supported with a strong low heat leak support structure (290). Multiple coils sets can be used to extend the axial length of the heat source (50) and hence increase hydrocarbon (390) production. Multiple coils sets electrically connected in series along their longitudinal axis are shown in more detail in FIG. 14. Only a single coil (260) is shown in FIG. 5 for brevity and clarity, although a plurality coils may be used in actual implementation. The coil (260) is contained with the coil casing (300) which confines the inlet cryogenic coolant (80). The coil cryostat (310) defines the outermost boundary of the return cryogenic flow (110) and provides the thermal barrier between the hot ambient surroundings and the cold cryogenic environment. The coil cryostat (310) is typically vacuum insulated for extreme thermal isolation of the cold cryogenic fluid (360) and the hot hydrocarbons (390). The coils may be supported in the axial (longitudinal) direction with another strong low heat leak support structure (320). At the top of FIG. 5, the cryogen inlet flow (330) is shown along the central former (90) and the cryogenic return flow (340) is shown along the annulus (110) of the cable. As discussed previously, the direction of the cryogen flow may be reversed if desired. The cryogen inlet flows from the top of the coil to the bottom of the coil along its axis. Radial flow of the cryogen inlet is limited by the coil casing boundary (300). The cryogen inlet flow (330) exits the coil casing at the bottom of the axial length of the coil heat source (230) at the cryogen flow feed through (350). When the cryogen (360) first enters the co-axial cable (170) above ground, it is at it coldest temperature, as the cryogen (360) flows down the axial length of the power transmission cable (40) it slowly picks up heat and its temperature begins to rise. When the cryogen (360) exits the power transmission cable (40) its temperature has been raised by an amount delta T. As the electromagnetic energy is deposited on the well-casing (420), the well-casing heats up. This causes the heat to radiate in all directions surrounding the well-bore (30). Once the hydrocarbons (390) get hot enough, the viscosity decreases and the hydrocarbons (390) begin to flow. The hydrocarbons (390) flow in radially through carefully sized slots in the well-casing (420). As the pressure begins to build, the now heated hydrocarbons (390) with their lower viscosity begin to flow in the axial direction (380) and back up the well-casing where they eventually exit the well-head (10) and are collected for subsequent refinement. An electrical bus (400 and 410) connects the positive and negative side of the co-axial power transmission cable (170) to the heat source (50). The heat source (50) in FIG. 5 is a single coil or multiple coils. The electromagnetic energy transmitted by the cable (40) is inductively coupled to the well-casing (420).

FIG. 6: A 2-d cross-sectional view of a down-hole heating device is shown in FIG. 6. Electrical power is transmitted down the power transmission cable (40) to the heat source (50). In this embodiment, the power transmission cable (40) is a three-phase tri-axial cable (70) and the heat source (50) is a single three-phase coil set (230), comprising a Phase A coil (260), a Phase B coil (270), and a Phase C coil (280), that are inductively coupled to the well-casing (420). Multiple three-phase coils sets can be used to extend the axial length of the heat source (50) and hence increase hydrocarbon (390) production. Multiple coils sets electrically connected in series along their longitudinal axis are shown in more detail in FIG. 14. Only one coil of the three-phase coil set (230) is shown for brevity and clarity purposes, although a plurality coils may be used in actual implementation. The three-phase coil set (230) is wound on an internal bobbin (250) and supported in the radial direction with a coil support (290). The coil support (290) must be strong, lightweight, and low heat leak. The coil radial support (290) and axial supports (320) the three-phase coil set (230) against the coil casing (300). The cryogen inlet flow (330) is down the central former (80) and the cryogen outlet flow (340) is within the annulus (110) of the tri-axial cable (70). In this embodiment, the tri-axial cable (70) is configured to operate cryogenically cold while the heat source (50) is configured to operate at warm ambient temperature. The tri-axial cable (70) is electrically connected to the three-phase coil (230) via three separate power buses, Phase A bus (430), Phase B bus (440), and the Phase C bus (450). A low heat leak compact hermetic power feed-through (460) is also referred to as a termination or bushing. The termination or bushing is electrically isolated from the flange (470) which hermetically seals the warm ambient coil (230) from the cryogenically cold power transmission cable (40). In this embodiment, the power transmission cable (40) cryostat (160) does not contain the heat source (50). When the cryogen (360) first enters the tri-axial cable (70) above ground it is at it coldest temperature, as the cryogen (360) flows down the axial length of the power transmission cable (40) it slowly picks up heat and its temperature begins to rise. When the cryogen (360) exists the power transmission cable (40) its temperature has been raised by an amount delta T. As the electromagnetic energy is deposited on the well-casing (420), the well-casing heats up. This causes the heat to radiate in all directions surrounding the well-bore (30). Once the hydrocarbons (390) get hot enough, the viscosity decreases and the hydrocarbons (390) begin to flow. The hydrocarbons (390) flow in radially through carefully sized slots in the well-casing (420). As the pressure begins to build, the now heated hydrocarbons (390) with their lower viscosity begin to flow in the axial direction (380) and back up the well-casing where they eventually exit the well-head (10) and are collected for subsequent refinement.

FIG. 7: A 2-d cross-sectional view of a down-hole heating device is shown in FIG. 7. DC electrical power is transmitted down the power transmission cable (40) to the heat source (50). The power transmission cable shown in FIG. 7 is a co-axial configuration (70) although other cable configurations such as the bi-polar cable (220) shown in FIG. 3b could also be used. In this embodiment, the heat source (50) is a coil (260) inductively coupled to the well-casing (420). The primary difference between FIG. 7 and FIG. 5, is that the coil in FIG. 7 mechanically rotates and/or vibrates around its axis of rotation (500) and is powered with DC electrical current and not AC current. The slip ring (490) transitions the components from the stationary frame to the rotating reference frame. Electrical power from the power transmission cable (40) and cryogenic cooling fluid (360) is transmitted from the stationary frame to the rotating frame via the slip ring (490). Multiple coils sets can be used to extend the axial length of the heat source (50) and hence increase hydrocarbon (390) production. Multiple coils sets electrically connected in series along their longitudinal axis are shown in more detail in FIG. 14. Only a single coil (260) is shown in FIG. 7 for brevity and clarity purposes, although a plurality coils may be used in actual implementation. The coil (260) is wound on the coil bobbin (250) and is contained within the coil casing (300), which confines the inlet cryogenic coolant (330). The coil cryostat (310) defines the outermost boundary of the return cryogenic flow (340) and provides the thermal isolation barrier between the hot ambient surroundings such as the hydrocarbon (390) and the cold cryogenic environment. The coil cryostat (310) is typically vacuum insulated for extreme thermal isolation of the cold cryogenic fluid (360) and the hot hydrocarbons (390). The coil (260) rotates via the slip ring or bearing (320) located at either the bottom end of the coil, the top of the coil (480), or both the top (480) and bottom ends (320) of the coil (260). The mechanical rotation and/or vibration of the coil (260) is provided by a rotating/vibrating shaft (480) at a fixed rotation frequency or a variable set of frequencies. At the top of FIG. 7, the cryogen inlet flow (330) is shown along the central former (90) and the cryogenic return flow (340) is shown along the annulus (110) of the cable. As discussed previously, the direction of the cryogen flow may be reversed if desired. The cryogen inlet flows from the top of the coil to the bottom of the coil along its longitudinal axis. Radial flow of the cryogen (360) inlet is limited by the coil casing boundary (300). The cryogen inlet flow (330) exits the coil casing at the bottom of the axial length of the coil (260) at the cryogen flow feed through (350). A one-way check valve (not shown) may be included at the cryogen flow feed-through (350) to isolate the cryogen inlet flow (330) from the cryogen return flow (340). When the cryogen (360) first enters the co-axial cable (170) above ground, it is at it coldest temperature, as the cryogen (360) flows down the axial length of the power transmission cable (40) it slowly picks up heat and its temperature begins to rise. When the cryogen (360) exits the power transmission cable (40) its temperature has been raised by an amount delta $T$. As the electromagnetic energy is deposited on the well-casing (420), the well-casing (420) heats up. This causes the heat to radiate in all directions surrounding the well-bore (30). Once the hydrocarbons (390) get hot enough, the viscosity decreases and the hydrocarbons (390) begin to flow. The radial flow (370) of the hydrocarbons (390) is through carefully sized slots or porous screened meshes located on the well-casing (420). As the pressure begins to build, the heated hydrocarbons (390) with their lower viscosity begin to flow in the axial direction (380) and back up the well-casing where they eventually exit the well-head (10) and are collected for subsequent refinement. An electrical bus (400 and 410) connects the positive and negative side of the co-axial power transmission cable (170) to the heat source (50). The heat source (50) in FIG. 5 is a single coil or multiple coils. The electromagnetic energy transmitted by the power cable (40) is inductively coupled to the well-casing (420) by the rotating coil (260) which is driven by shaft (480) about the axis of rotation (500). The well-casing (420) can be made out of electrical conducting material such as Cu or Al or electrically conducting material that is also magnetic permeable such as steel. Electrically conducting and magnetic permeable material helps improve the inductive coupling between the rotating DC coil (260) and the fixed well-casing (420). In another embodiment (not shown), both the well-casing (420) and the DC coil (260) are rotating in opposite directions relative to one another.

FIG. 8: A 2-d cross-sectional view of a down-hole heating device is shown in FIG. 8. DC electrical power is transmitted down the power transmission cable (40) to the heat source (50). The power transmission cable shown in FIG. 8 is a bi-polar configuration (220), although other cable configurations such as the co-axial cable (70) shown in FIG. 2a could also be used. In this embodiment, the heat source (50) is a coil (260) inductively coupled to the well-casing (420). The primary difference between FIG. 8 and FIG. 7, is that the coil in FIG. 8 is stationary, however, the well-casing (420) mechanically rotates around its axis of rotation (500). The coil (260) in this embodiment is powered with DC electrical current and not AC current. The slip ring (490) transitions the components from the stationary frame to the rotating reference frame. DC electrical power from the power transmission cable (40) and cryogenic cooling fluid (360) is transmitted from the stationary frame to the rotating frame via the slip ring (490). Multiple coils sets can be used to extend the axial length of the heat source (50) and hence increase hydrocarbon (390) production. Multiple coils sets electrically connected in series along their longitudinal axis are shown in more detail in FIG. 14. Only a single coil (260) is shown in FIG. 7 for brevity and clarity purposes, although a plurality coils may be used in actual implementation. The coil (260) is wound on the coil bobbin (250) and is contained within the coil casing (300), which confines the inlet cryogenic coolant (330). The coil cryostat (310) defines the outermost boundary of the return cryogenic flow (340) and provides the thermal isolation barrier between the hot ambient surroundings such as the hydrocarbon (390) and the cold cryogenic environment. The coil cryostat (310) is typically vacuum insulated for extreme thermal isolation of the cold cryogenic fluid (360) and the hot hydrocarbons (390). The mechanical rotation of the well-casing (420) is provided by a rotating shaft (not shown) at a fixed rotation frequency or a variable set of frequencies. At the top of FIG. 8, the cryogen inlet flow (330) is shown along the central former (90) and the cryogenic return flow (340) is shown along the annulus (110) of the power transmission cable (40). As discussed previously, the direction of the cryogen flow may be reversed if desired. The cryogen inlet flows from the top of the coil to the bottom of the coil along its longitudinal axis. Radial flow of the cryogen (360) inlet is limited by the coil casing boundary (300). The cryogen inlet flow (330) exits the coil casing at the bottom of the axial length of the coil (260) at the cryogen flow feed through (350). A one-way check valve (not shown) may be included at the cryogen flow feed-through (350) to isolate the cryogen inlet flow (330) from the cryogen return flow (340). When the cryogen (360) first enters the co-axial cable (170) above ground, it is at it coldest temperature, as the cryogen (360) flows down the axial length of the power transmission cable (40) it slowly picks up heat and its temperature begins to rise. When the cryogen (360) exits the power transmission cable (40) its temperature has been raised by an amount delta $T$. As the electromagnetic energy is deposited on the well-casing (420), the well-casing (420) heats up. This causes the heat to radiate in all directions surrounding the well-bore (30). Once the hydrocarbons (390) get hot enough, the viscosity decreases and the hydrocarbons (390) begin to flow. The radial flow (370) of the hydrocarbons (390) is through carefully sized slots or porous screen meshes located on the well-casing (420). As the pressure begins to build, the heated hydrocarbons (390) with their lower viscosity begin to flow in the axial direction (380) and back up the well-casing where they eventually exit the well-head (10) and are collected for subsequent refinement. An electrical bus (400 and 410) connects the positive and negative side of the co-axial power transmission cable (170) or bi-polar cable (220) to the heat source (50). The heat source (50) shown in FIG. 8 is a single coil or multiple coils. The electromagnetic energy transmitted by the power cable (40) is inductively coupled to the well-casing (420) by the rotating well-casing (420) which is driven by shaft (not) about the axis of rotation/vibration (500). The well-casing can be made out of electrical conducting material such as Cu or Al or electrically conducting material that is also magnetic permeable such as steel. Electrically conducting and magnetic permeable material helps improve the inductive coupling between the fixed DC coil and the rotating well-casing. In another embodiment (not shown), both the well-casing (420) and the DC coil (260) are rotating in opposite directions relative to one another.

FIG. 9a: A 2-d cross section view of the down-hole heating device is shown in FIG. 9a. The power transmission cable (40) shown in FIG. 9a is a co-axial type cable (170), although a bi-polar type (220) cable configuration could also be used. The heat source (50) shown in FIG. 9a is a resistive heating element (540). The resistive heating element (540) can be electrically powered with single phase AC current or DC current at a specified voltage level. Although only a single heating element (540) electrically connected in a single-phase arrangement is shown for simplicity purposes, a plurality of heating elements could be implemented to maximize heating deposition into the well bore (30). There are many types of materials that could comprise the resistive heating element including: among other types of resistive materials. The restive heating element (540) is embedded in a solid insulating matrix (530) that electrically isolated the heating element (540) from the well casing (420). The solid insulating matrix must be able to withstand high temperatures often in excess of 300° C. without degrading, for prolonged periods of time. There are many types of materials that could comprise the solid insulating materials including: MgO, Al2O3, ZrO, YSZ, ceramics, among other types of high temperature insulating materials. For the down-hole heating device shown in FIG. 9a, the power transmission cable (40) operates cryogenically cold and the heat source (50) operates at warm ambient temperatures. The cryogen (360) inlet flow (330) flows down the central former (90). The cryogen (360) return flow (340) flows in the annular space between the co-axial cable (170) or bi-polar cable (220) outer diameter and the inner wall of the cryostat (160). The cryostat (160) is typically vacuum insulated and thermally isolates the cold cryogenic power cable (40) from the warm-to-hot ambient surroundings and the heat source (50). The cryogen (360) flows through a feed through (350) that separates the inlet flow (330) from the return flow (340). A one-way check valve (not shown) may be used to prevent backflow and separate the inlet flow (330) from the return flow (340) if required.

Figure 3A:
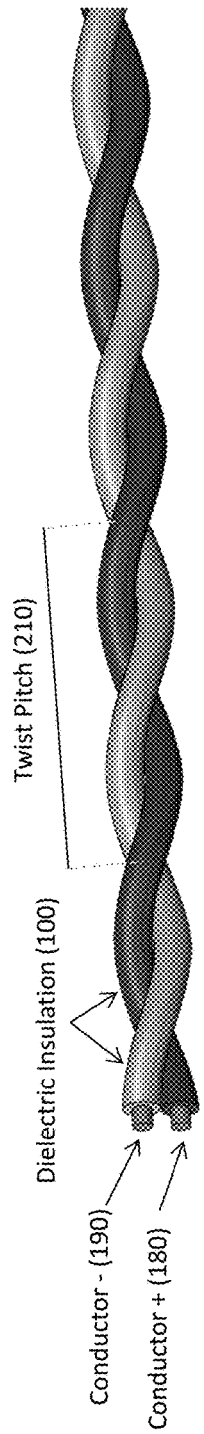
FIG. 3a: A side-view of a twisted conductor pair (200) is shown in FIG. 3a. The twisted conductor pair (200) is comprised of a positive conductor (180) and a negative conductor (190). Both the positive conductor (180) and the negative conductor (190) are covered with a dielectric material (100) to provide electrical insulation to a rated voltage level. It is important to select an electrical insulation (100) that is cryogenically compatible for power transmission cables (40) that are operated cryogenically cold. It is beneficial to twist and transpose the positive (180) and negative (190) conductors in AC application to help minimize losses and reduce stray magnetic fields. The periodic length scale over which the positive (180) and negative (190) conductors are twisted is referred to as the twist pitch (210) length.
Figure 3B:
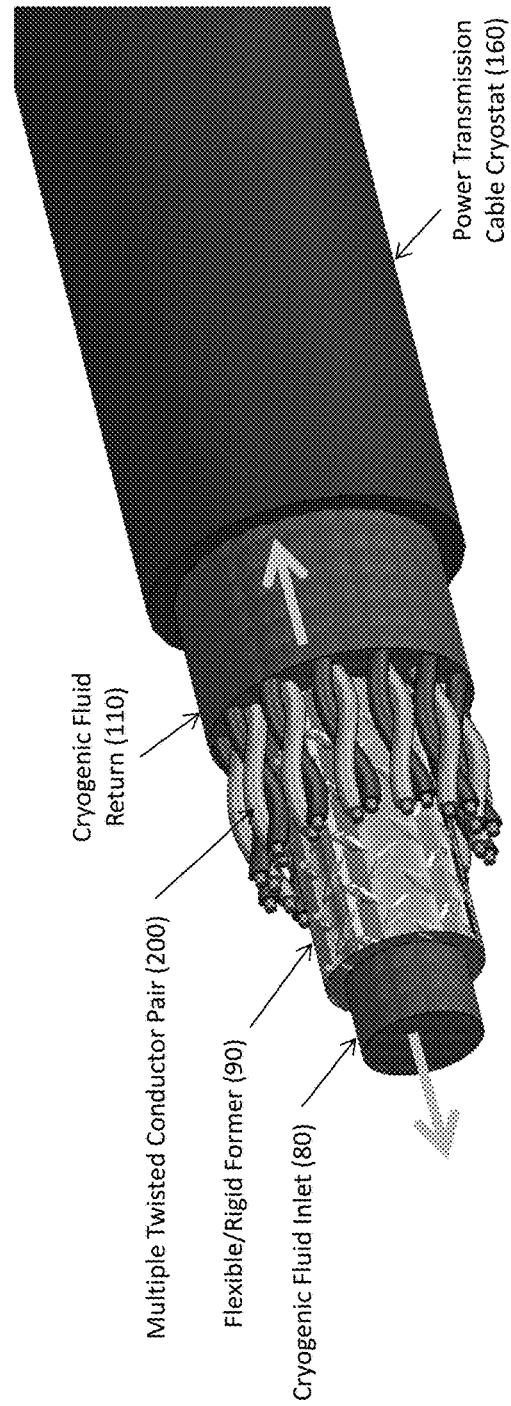
FIG. 3b: A side-view of a bi-polar cable (220) is shown in FIG. 3b. The cryogenic cooling fluid inlet (80) flows down the central former (90) of the bi-polar cable (220). The central former (90) can either be flexible or rigid depending upon the application and requirements. The cryogenic cooling return flow (110) is along the annulus of the bi-polar cable (220). It is possible to reverse the direction of the cryogenic cooling flow so that the cooling fluid inlet is within the bi-polar cable's annulus and the return flow is along the central former (90). There is a plurality of twisted conductor pairs (200) surrounding the periphery of the central former (90) to carry current within the bi-polar cable (220). The cryostat (160) can be made of straight vacuum jacketed pipe or corrugated wall pipe to enhance flexibility if required. The twisted conductor pair (200) supplies power from the power source (590) to the heat source (50). There are a plurality of twisted conductor pairs (200) surrounding the central former (90) to increase the amount of current and hence power supplied along the power transmission cable (220). Twisting and transposing the conductor pairs (200) help to minimize losses and reduce stray magnetic fields.

An electrical bus (400 and 410) connects the positive and negative polarity of the power cable (40) to the heat source (50), which in FIG. 9a is a resistive heating element (540). A low heat leak hermetic feed-through (470) sometimes referred to as a bushing, current lead, termination, etc. provides the electrical connection from the power cable (40) operating cryogenically cold to the heat source (50) operating at warm-to-hot ambient temperatures. The hermetic feed-through must provide a low heat leak to the cryogen (360) and electrically isolate the electrical bus (400 and 410) from the grounded or floating well casing (420) and cryostat (160). The hermetic feed-through (470) must be compact to fit well within the well-bore (30) and mechanically strong enough to handle the rugged operation required for hydrocarbon production.

FIG. 9b: A 2-d cross-sectional view looking up from the bottom of the heat source (50) is shown in FIG. 9b. The solid ceramic insulation (530) electrically isolates the resistive heating element (540) from the well casing (420) and helps conduct the heat from the very hot heating element (540) to the well casing (420). Hydrocarbons (390) can flow in radially (370) from the well casing (420) through carefully designed slots or holes on the well casing. Once the pressure builds, the hydrocarbons (390) and begin to flow upwards in the axial direction and eventually exit the production well. Specially designed hydrocarbon channels (550) provide space between the outermost perimeter of the heat source (50) and the well casing (420). The size, shape, and number of hydrocarbon channels (550) is carefully designed to optimize heat deposition from the heating element (540) to the well casing (420) while maximizing hydrocarbon (390) throughput for maximum production of desired commodities.

FIG. 10a: A 2-d cross section view of the down-hole heating device is shown in FIG. 10a. The power transmission cable (40) shown in FIG. 10a is a tri-axial type cable (70), although a triad cable configuration (not shown), or three separate co-axial cable configurations (170) could also be used. The heat source (50) shown in FIG. 10a is a resistive heating element (540). The resistive heating element (540) can be electrically powered with three-phase AC current to a specified voltage level. Although only three separate heating elements (540) electrically connected in a three phase arrangement are shown for simplicity purposes, a plurality of three-phase heating elements could be implemented to maximize heating deposition into the well bore (30). There are many types of materials that could comprise the resistive heating element including: among other types of resistive materials. The restive heating element (540) is embedded in a solid insulating matrix (530) that electrically isolated the heating element (540) from the well casing (420). The solid insulating matrix must be able to withstand high temperatures often in excess of 300° C. without degrading, for prolonged periods of time. There are many types of materials that could comprise the solid insulating materials including: MgO, Al2O3, ZrO, YSZ, ceramics, among other types of high temperature insulating materials. For the down-hole heating device shown in FIG. 10a, the power transmission cable (40) operates cryogenically cold and the heat source (50) operates at warm-to-hot ambient temperatures. The cryogen (360) inlet flow (330) flows down the central former (90). The cryogen (360) return flow (340) flows in the annular space between the co-axial cable (170) or bi-polar cable (220) outer diameter and the inner wall of the cryostat (160). The cryostat (160) is typically vacuum insulated and thermally isolates the cold cryogenic power cable (40) from the warm ambient surroundings and the heat source (50). The cryogen (360) flows through a feed through (350) that separates the inlet flow (330) from the return flow (340). A one-way check valve (not shown) may be used to prevent backflow and separate the inlet flow (330) from the return flow (340) if required.

An electrical bus (400 and 410) connects the positive and negative polarity of the power cable (40) to the heat source (50), which in FIG. 10a is a three-phase resistive heating element (540). A low heat leak hermetic feed-through (470) sometimes referred to as a bushing, current lead, termination, etc. provides the electrical connection from the power cable (40) operating cryogenically cold to the heat source

(50) operating at warm-to-hot ambient temperatures. The hermetic feed-through must provide a low heat leak to the cryogen (360) and electrically isolate the electrical bus (400 and 410) from the grounded or floating well casing (420) and cryostat (160). The hermetic feed-through (470) must be compact to fit well within the well-bore (30) and mechanically strong enough to handle the rugged operation required for hydrocarbon production.

FIG. 10b: A 2-d cross-sectional view looking up from the bottom of the heat source (50) is shown in FIG. 10b. The solid ceramic insulation (530) electrically isolates the resistive heating element (540) from the well casing (420) and helps conduct the heat from the very hot heating element (540) to the well casing (420). Hydrocarbons (390) can flow in radially (370) from the well casing (420) through carefully designed slots or holes on the well casing. Once the pressure builds, the hydrocarbons (390) and begin to flow upwards in the axial direction and eventually exit the production well. Specially designed hydrocarbon channels (550) provide space between the outermost perimeter of the heat source (50) and the well casing (420). The size, shape, and number of hydrocarbon channels (550) is carefully designed to optimize heat deposition from the heating element (540) to the well casing (420) while maximizing hydrocarbon (390) throughput for maximum production of desired commodities.

FIG. 11: A simple schematic of the above ground electrical and thermal connection for a superconducting down-hole heating system servicing a vertical well (20) is shown in FIG. 11. The instrumentation and control (560) enclosure of the down-hole heating system contains the control panel hardware and software that operates, controls, and regulates the power flow from the power source (590) to the heat source (50). A transformer (580) is typically used in AC power systems to step-up and step-down the power from the power source (590) that powers the heat source (50). The transformer (580) can either directly power the heat source (50) or it can power a separate power supply (610) that energizes and de-energizes the heat source (50). For DC systems down-hole heating systems, it is often necessary to include the power supply (610) to regulate the power to the heat source similarly to the motors that mechanically rotate the heating tool or the well-casing or both. The power cable (40) is fed into the well (20) via a power cable translation system (620) located above ground. The power cable translation system (620) axially translates the power cable (40) by pushing and/or pulling to the power cable (40) to a desired axial position within the well (20). It is often convenient to locate the cable translation system (620) in the vicinity of the well-head (10). The cryogens (360) that flow within the power cable (40) and contained within the cryostat (160) typically originate from a storage tank (600) located above ground. The cryogenic storage tank (600) that cools the power cable must be periodically refilled as necessary.

Figure 12:
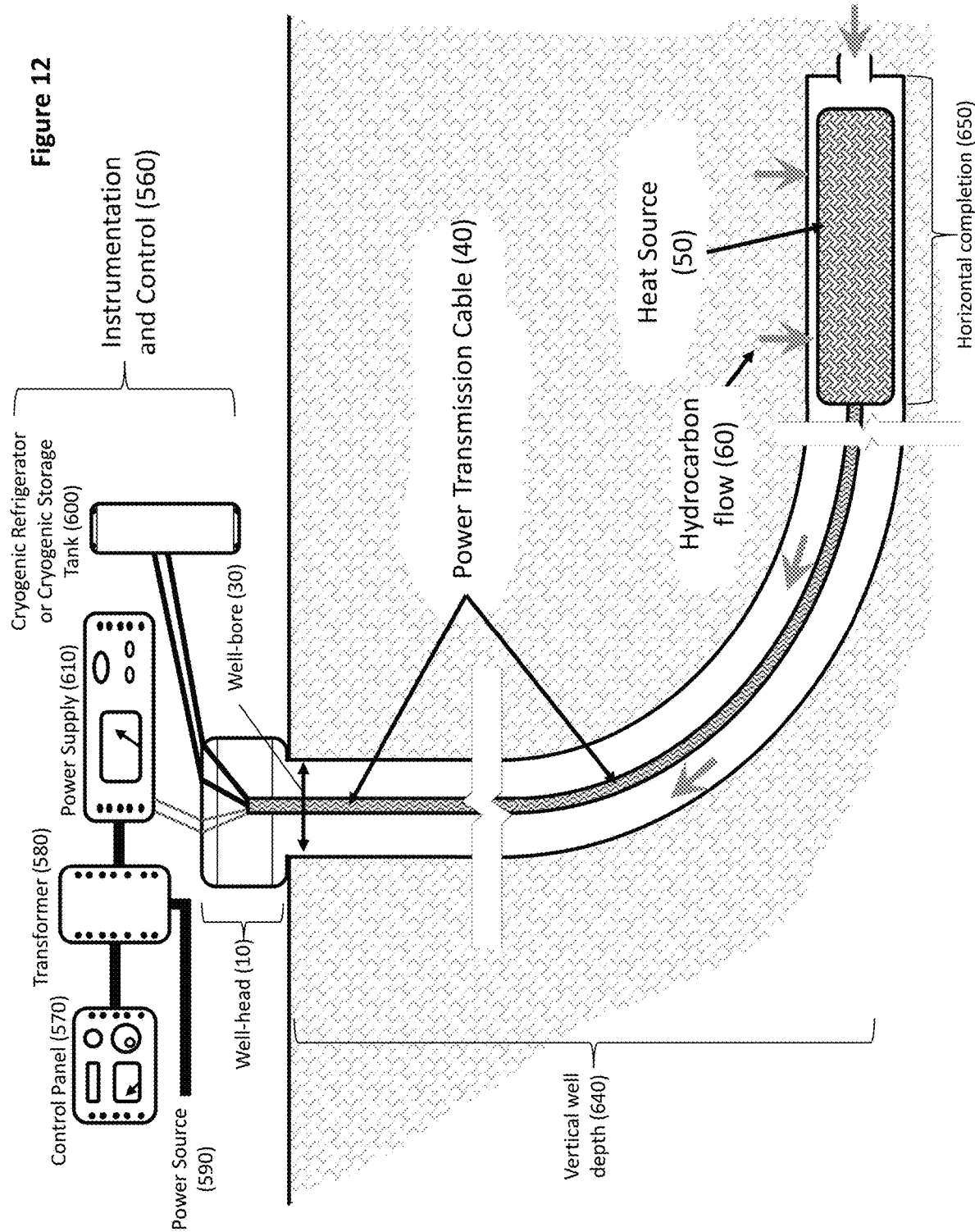

FIG. 12: A simple schematic of the above ground electrical and thermal connection for a superconducting down-hole heating system servicing a horizontal well is shown in FIG. 12. The horizontal well is comprised of a vertical depth (640) and a horizontal completion (650). It is important to note that if the bend radius (or diameter) of the well (20) that transitions from the vertical well depth (640) to the horizontal completion (650) is large enough, a flexible corrugated cryostat (160) may not be necessary and a thinner wall solid cryostat wall may be implemented. It is also possible to use a combination of both a flexible corrugated cryostat (160) in the regions requiring maximum flexibility and a non-corrugated cryostat (160) in the regions of the well (20) requiring less flexibility. The instrumentation and control (560) enclosure of the down-hole heating system contains the control panel hardware and software that operates, controls, and regulates the power flow from the power source (590) to the heat source (50). A transformer (580) is typically used in AC power systems to step-up and step-down the power from the power source (590) that powers the heat source (50). The transformer (580) can either directly power the heat source (50) or it can power a separate power supply (610) that energizes and de-energizes the heat source (50). For DC systems down-hole heating systems, it is often necessary to include the power supply (610) to regulate the power to the heat source similarly to the motors that mechanically rotate the heating tool or the well-casing or both. The power cable (40) is fed into the well (20) via a power cable translation system (620) located above ground. The power cable translation system (620) axially translates the power cable (40) by pushing and/or pulling to the power cable (40) to a desired axial position within the well (20). It is often convenient to locate the cable translation system (620) in the vicinity of the well-head (10). The cryogens (360) that flow within the power cable (40) and contained within the cryostat (160) typically originate from a storage tank (600) located above ground. The cryogenic storage tank (600) that cools the power cable must be periodically refilled as necessary.

FIG. 13: A simple schematic showing the use of the electric down-hole heating system in a typical steam assisted gravity drainage (SAGD) operation. In conventional SAGD operations high quality saturated steam (often referred to as 100% quality steam) located above ground is pumped below ground (660). As the steam travels down the well (20) latent heat is lost to the surrounding and the steam can become low quality and no longer be saturated. Latent heat losses can range anywhere from 15% to 40% depending on situation. In this disclosure, a more energy efficient electric heating system is used below ground to heat steam in-situ to provide high quality 100% saturated steam within the confines of the well-bore. The electrical heating system (i.e. power transmission cable (40) and heat source (50) described in this disclosure can be located in the steam pipe itself (not shown) or located in the separate well-bore adjacent to the steam line or in both the steam line (not shown) and the separate well-bore.

FIG. 14a: A simple 2-d schematic of the electrical configuration for an inductive down-hole heating system is shown in FIG. 14a. In FIG. 14a, the heat source (50) is a plurality of coils (670) inductively coupled to the well casing (420), so that the electrical energy supplied by the power source (590) is inductively coupled to the well-casing (420). The well casing (420) can be either electrically conducting such as copper, aluminum, silver, gold, brass, bronze, tin, nickel, alloys thereof, among other electrically conducting materials or both magnetic permeable and electrically conductive such as iron, nickel, cobalt, carbon steel, alloys thereof, among other electrically conducting and magnetic permeable materials. A plurality of coils (670) are electrically connected either in series, parallel, or both series and parallel to extend the axial length of the heat source (670). The plurality of coils (670) can be wound on an internal bobbin (250). It is often beneficial if the bobbin is comprised of magnetic permeable material. This helps to reduce the number of ampere turns required for the coils (670). Depending upon the desired configuration, the power source (590) can be a single-phase AC source, a three-phase AC source, or a DC power source. If a three-phase AC power source (590) is utilized a common coil configuration is shown in FIG. 4 where the Phase A coil (120), Phase B coil (130), and Phase C coil (140) are electrically connected in a three-phase arrangement and are typically placed approximately 120° apart. It is important to note in this disclosure that the phrase "multiple coils" or a "plurality of coils" is used to mean both the multiple coils used to extend the axial length of the heat source as well as the multiple coils used for example in the three phase coil arrangement. In FIG. 14*a*, multiple coils (670) are electrically connected so that the axial arrangement is such that the magnetic poles of each coil are given by a repeating North-South (N-S)→(N—S)→(N—S . . . ) arrangement. In order to increase the production of hydrocarbons from the well, it is often beneficial to extend the axial length of heat source (50). The heat sources used on production sites can be quite long and are often lengths of up to 1 km or greater. Since it is not convenient or practical to construct a single heat source (50) with a single km long coil (670), it is more convenient to construct a heat source (50) that is comprised of multiple discrete unit length coils (670). Typically a convenient discrete unit length is that of which can be transported by rail or large truck (680). While this discrete unit length of the heat source (50) can vary, some common discrete lengths are typically 10-15 meters in length FIG. 14*b*: A simple 2-d schematic of the electrical configuration for an inductive down-hole heating system is shown in FIG. 14*b*. In FIG. 14*b*, the heat source (50) is a plurality of coils (670) inductively coupled to the well casing (420), so that the electrical energy supplied by the power source (590) is electrically coupled to the well-casing (420). In FIG. 14*b*, multiple coils (670) are electrically connected so that the axial arrangement is such that the magnetic poles of each coil are given by an alternating North-South (N-S)→(S—N)→(N—S)→(S—N . . . ) arrangement. There are advantages and disadvantages to both types of coil arrangements shown in FIGS. 14*a* and 14*b*. One advantage of the electrical configuration illustrated in FIG. 14*b* is that this type of arrangement tends to have lower AC impedance which can be beneficial when power with an AC power source (590).

Figure 15:
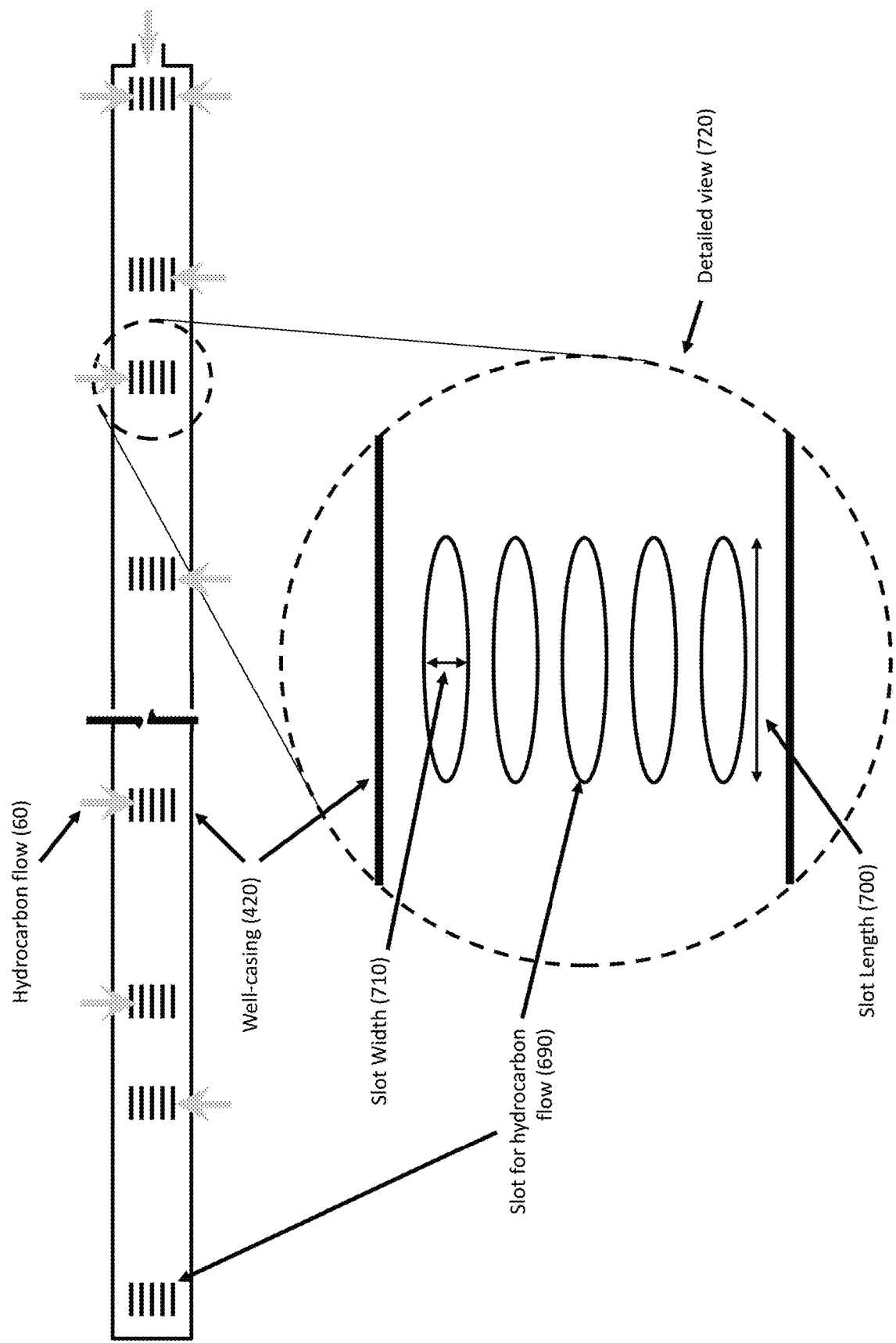

FIG. 15: A simple 2-d side view of the external well casing (420) is shown in FIG. 15. Carefully designed slots are cut into the well-casing (420) to allow hydrocarbon flow (60) into the well-casing (420). The hydrocarbon flow (60) into the well-casing (420) can be in both the radial direction and the axial direction at the open end of the well casing. The slot length (700) and slot width (710) must be carefully designed and optimized. The slot width cannot be too wide or excessive sand and other undesirable particles can enter the well casing. However, they cannot be too narrow so as to limit hydrocarbon (390) production. The slot size (width and length), number, and location along the well-casing (420) must be carefully designed and optimized to as to maximize both inductive heat generation on the wall of the well-casing while maximizing hydrocarbon throughput.

Figure 16:
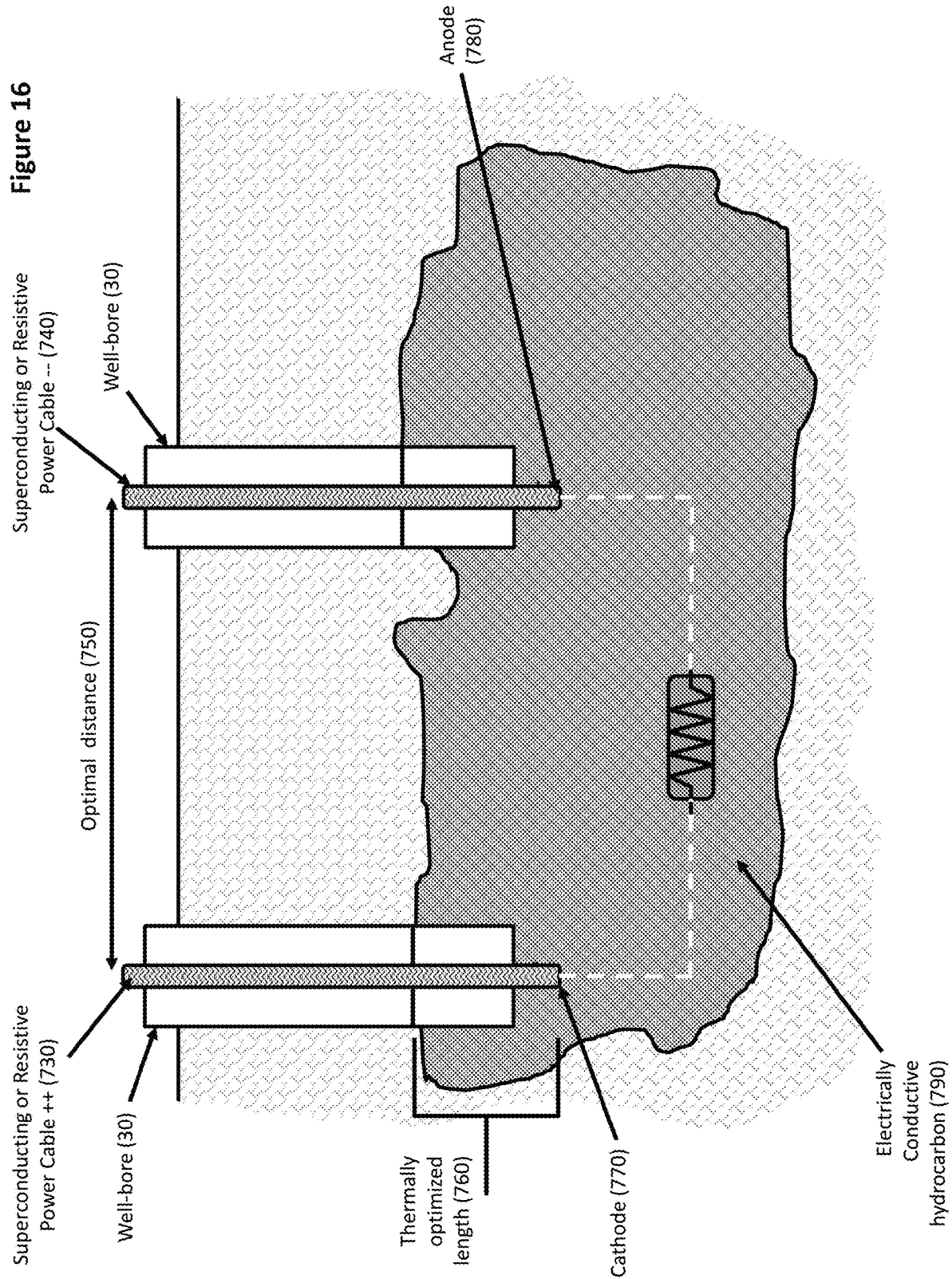

FIG. 16: A simple 2-d schematic of a down-hole heating system in which the hydrocarbon, water, or waste water is directly heated by ohmic conduction is shown in FIG. 16. For the down-hole heating system shown in FIG. 16, a positive electrode or cathode (770) and negative electrode or anode (780) are separated by an electrically conductive medium (790), which contains the hydrocarbon (390), water, waste water, or related commodity. When the power cables (730) and (740) are energized to a certain voltage level, electricity begins to flow between the two electrodes (770 and 780) resulting from the conductivity of the medium (790). As the applied voltage level is increased, the larger the electrical current flowing between the electrodes and hence the larger the ohmic heating. When the current flows between the electrodes, ohmic heat is generated, which begins to heat the electrically conductive medium. Located within one well-bore (30) is the superconducting or resistive non-superconducting power cable (730), while the second well-bore (30) contains the other superconducting or resistive non-superconducting power cable (740). The separation spacing between the cathode (770) and the anode (780) must be optimized (750) so as to maximize heat generation in the conducting medium and hydrocarbon production or water heating. The superconducting or resistive power cables are designed to operate at both high voltage and current with either a single phase AC or DC power source (590). The cathode (760) and anode (780) protruding into the production zone heat the surrounding medium. Since the superconducting cable or non-superconducting cable may be cryogenically cooled, there must be a certain thermally optimized length (760) separating the hot production zone from the cryogenically cooled power cables (730 and 740).

Figure 17:
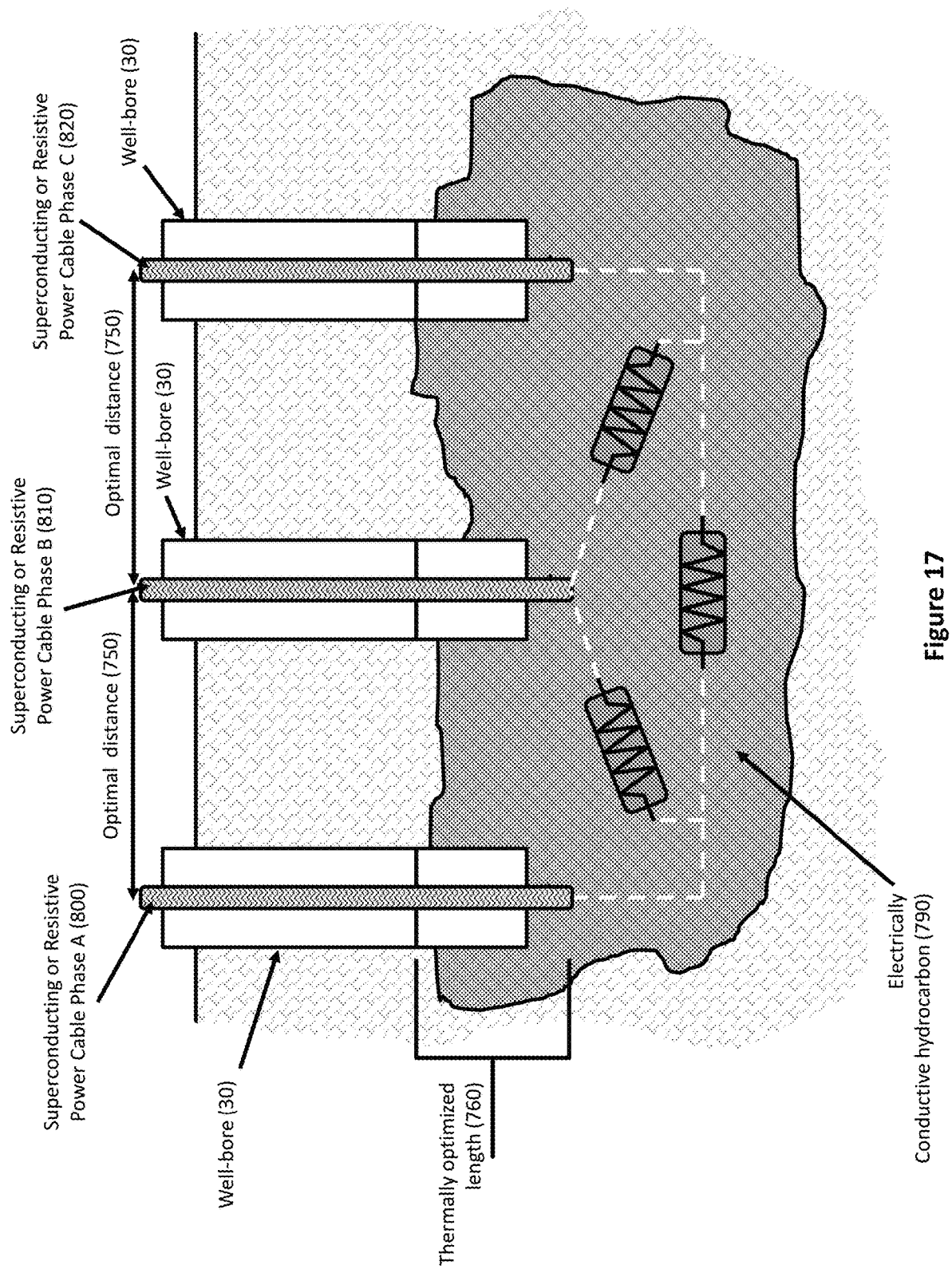

FIG. 17: A simple 2-d schematic of a down-hole heating system in which the hydrocarbon, water, or waste water is directly heated via ohmic conduction by a three-phase AC power source (590) is shown in FIG. 17. For the down-hole heating system shown in FIG. 17, three separate power cables are energized namely: Power Cable Phase A (800), Power Cable Phase B (810) and Power Cable Phase C (820). The separation spacing between the three Phase cables should be optimized (750) so as to maximize heat generation in the conducting medium (790). The superconducting or resistive power cables are designed to operate at both high voltage and current with three phase AC power source (590). As the applied voltage level is increased, the larger the electrical current flowing between the electrodes, which corresponding increases the ohmic heating of the electrically conducting medium (790). The superconducting or non-superconducting cables (800, 810, 820) can be contained within a single well-bore (30) although it is more effective if they are located in three separate well-bores (30) that are equally spaced at approximately 120° apart and an optimal distance (750). The optimal spacing will depend upon many varying factors including the applied voltage level and the conductivity of the medium (790) which can vary from location to location. This embodiment can be particularly useful in the heating and removal of wastewater located below ground.

The invention claimed is:

1. A superconducting down-hole heating device for heating commodities that have a viscosity, and which are disposed proximate a well-casing, the heating device comprising:

a superconducting cable, a cryostat around the superconducting cable, and an induction source disposed within the cryostat and electrically coupled to the superconducting cable, configured to use within the well-casing, where the induction source, when powered, causes the well-casing to produce heat, thereby warming the commodities and reducing the viscosity of the commodities.

2. The superconducting down-hole heating device of claim 1, wherein the heat source is configured to generate steam down-hole, in-situ within a well-bore in which the well-casing is disposed.

3. The superconducting down-hole heating device of claim 1, wherein the down-hole heating device is configured to reduce water usage, reduce energy consumption, improve energy efficiency, enhance production capacity, reduce greenhouse gas emissions, or a combination thereof during a hydrocarbon extraction process.

4. The superconducting down-hole heating device of claim 1, wherein the superconducting cable is comprised of superconducting conductors including at least one of: Y—Ba—Cu—O, Re—Ba—Cu—O, Bi—Sr—Ca—Cu—O, Bi—Pb—Sr—Ca—Cu—O, Tl—Ba—Ca—Cu—O, Hg—Ba—Ca—Cu—O, Mg—B, MgB2, Nb—Ti, Nb—Sn, Nb—Al, ferro-chalcogenides, ferro-pnictides, or chemically doped alloys and mixtures thereof.

5. The superconducting down-hole heating device of claim 1, wherein the superconducting cable is at least one of a three-phase tri-axial cable, a co-axial cable, a Robel cable, a cable on round core, a three-phase three-cores-in-one cable, a bi-polar cable, a twisted stack cable, or a cable-in-conduit-conductor cable.

6. The superconducting down-hole heating device of claim 1, wherein the superconducting cable comprises lengths of superconducting conductors that are electrically connected together to form a longer continuous length.

7. The superconducting down-hole heating device of claim 1, wherein the well casing is at least one of electrically conducting or magnetically permeable, and can be inductively heated by electromagnetically coupling to the heat source.

8. The superconducting down-hole heating device of claim 1, wherein the induction source is a non-superconducting inductive coil.

9. The superconducting down-hole heating device of claim 1, wherein the induction source is a superconducting inductive coil.

10. The superconducting down-hole heating device of claim 1, wherein the induction source is a coil that is wound on a magnetic permeable core that enhances magnetic field and reduces a number of ampere-turns in the coil.

11. The superconducting down-hole heating device of claim 1, wherein the induction source comprises multiple induction coils.

12. The superconducting down-hole heating device of claim 1, further comprising a cryogenic cooling fluid configured to use with the superconducting cable, induction source, and cryostat.

13. The superconducting down-hole heating device of claim 12, wherein the cryogenic cooling fluid is pressurized and sub-cooled.

14. The superconducting down-hole heating device of claim 1, wherein the superconducting cable and induction source are configured to be powered with DC current while at least one of the induction source and the well-casing are rotating relative to one another.

* * * * *